US012289535B2

United States Patent
Desai et al.

(10) Patent No.: US 12,289,535 B2
(45) Date of Patent: Apr. 29, 2025

(54) SYSTEMS AND METHODS FOR MULTI-CONTEXT IMAGE CAPTURE

(71) Applicant: QUALCOMM Incorporated, San Diego, CA (US)

(72) Inventors: Rohan Desai, San Diego, CA (US); Masood Qazi, San Francisco, CA (US); Krishnam Indukuri, San Diego, CA (US); Vinod Kumar Nahval, Mountain House, CA (US); Rajakumar Govindaram, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 147 days.

(21) Appl. No.: 17/821,430

(22) Filed: Aug. 22, 2022

(65) Prior Publication Data
US 2024/0064417 A1 Feb. 22, 2024

(51) Int. Cl.
*H04N 23/80* (2023.01)
*H04N 23/667* (2023.01)

(52) U.S. Cl.
CPC .......... *H04N 23/80* (2023.01); *H04N 23/667* (2023.01)

(58) Field of Classification Search
CPC .... H04N 23/80; H04N 23/667; H04N 13/239; H04N 13/243; H04N 23/90; G06T 1/20
See application file for complete search history.

(56) References Cited

U.S. PATENT DOCUMENTS

| | | | | |
|---|---|---|---|---|
| 8,582,028 | B2* | 11/2013 | Zeng | H04N 5/44 345/1.3 |
| 2004/0021794 | A1* | 2/2004 | Nakayama | H04N 21/4345 348/E5.111 |
| 2016/0127616 | A1* | 5/2016 | Seshadrinathan | G06T 5/40 348/241 |
| 2016/0227160 | A1* | 8/2016 | Baek | G06F 13/4265 |
| 2018/0005344 | A1* | 1/2018 | Lim | G06T 1/20 |
| 2019/0110077 | A1* | 4/2019 | Kim | H04N 19/61 |
| 2020/0372682 | A1 | 11/2020 | Kim et al. | |
| 2023/0059924 | A1* | 2/2023 | Heinrich | G06N 3/044 |
| 2024/0155236 | A1* | 5/2024 | Cui | H04N 23/73 |

OTHER PUBLICATIONS

International Search Report and Written Opinion—PCT/US2023/071924—ISA/EPO—Nov. 27, 2023.

\* cited by examiner

*Primary Examiner* — Hung H Lam
(74) *Attorney, Agent, or Firm* — QUALCOMM Incorporated

(57) ABSTRACT

Imaging systems and techniques are described. For example, an imaging system may receive raw image data captured using an image sensor. The imaging system may process the raw image data according to a first image signal processor (ISP) setting to generate a first image and process the raw image data according to a second ISP setting (that is distinct from the first ISP setting) to generate a second image. The imaging system may output the first image and the second image.

30 Claims, 11 Drawing Sheets

SYSTEMS AND METHODS FOR MULTI-CONTEXT IMAGE CAPTURE

FIELD

The present disclosure generally relates to imaging. For example, aspects of the present disclosure relate to systems and techniques for multi-context image capture.

BACKGROUND

A camera is a device that receives light and captures image frames, such as still images or video frames, using an image sensor. Cameras may include processors, such as image signal processors (ISPs), that can receive one or more image frames and process the one or more image frames. For example, a raw image frame captured by a camera sensor can be processed by an ISP to generate a final image. Cameras can be configured with a variety of image capture and image processing settings to alter the appearance of an image. Some camera settings are determined and applied before or during capture of the photograph by the ISP. Other camera settings can configure post-processing of a photograph. Traditionally, ISP settings are set during camera calibration (e.g., during camera manufacturing) and do not change afterward. In some cases, however, different ISP settings may be better than others in different contexts and/or for different purposes.

BRIEF SUMMARY

Systems and techniques are described herein for multi-context image capture. According to aspects described herein, the systems and techniques can perform imaging in which different imaging settings are selected and used for image capture for different contexts, such as images intended for display to human viewers and images intended for computer vision applications.

According to at least one example, an apparatus for multi-context image capture is provided. The apparatus includes a memory and at least one processor (e.g., implemented in circuitry) coupled to the memory. The at least one processor is configured to and can: receive raw image data captured using an image sensor; process the raw image data according to a first image signal processor (ISP) setting to generate a first image; process the raw image data according to a second ISP setting to generate a second image, wherein the second ISP setting is distinct from the first ISP setting; and output the first image and the second image.

In another example, a method of multi-context image capture is provided. The method includes: receiving raw image data captured using an image sensor; processing, using an image signal processor (ISP), the raw image data according to a first ISP setting to generate a first image; processing, using the ISP, the raw image data according to a second ISP setting to generate a second image, wherein the second ISP setting is distinct from the first ISP setting; and outputting the first image and the second image.$ In another example, a non-transitory computer-readable medium is provided that has stored thereon instructions that, when executed by one or more processors, cause the one or more processors to: receive raw image data captured using an image sensor; process the raw image data according to a first image signal processor (ISP) setting to generate a first image; process the raw image data according to a second ISP setting to generate a second image, wherein the second ISP setting is distinct from the first ISP setting; and output the first image and the second image.

In another example, an apparatus for multi-context image capture is provided. The apparatus includes: means for receiving raw image data captured using an image sensor; means for processing the raw image data according to a first image signal processor (ISP) setting to generate a first image; means for processing the raw image data according to a second ISP setting to generate a second image, wherein the second ISP setting is distinct from the first ISP setting; and means for outputting the first image and the second image.

In some aspects, the apparatus is part of, and/or includes a wearable device, an extended reality device (e.g., a virtual reality (VR) device, an augmented reality (AR) device, or a mixed reality (MR) device), a head-mounted display (HMD) device, a wireless communication device, a mobile device (e.g., a mobile telephone and/or mobile handset and/or so-called "smart phone" or other mobile device), a camera, a personal computer, a laptop computer, a server computer, a vehicle or a computing device or component of a vehicle, another device, or a combination thereof. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyroscopes, one or more gyrometers, one or more accelerometers, any combination thereof, and/or other sensor).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following drawing figures.

DETAILED DESCRIPTION

Figure 1:
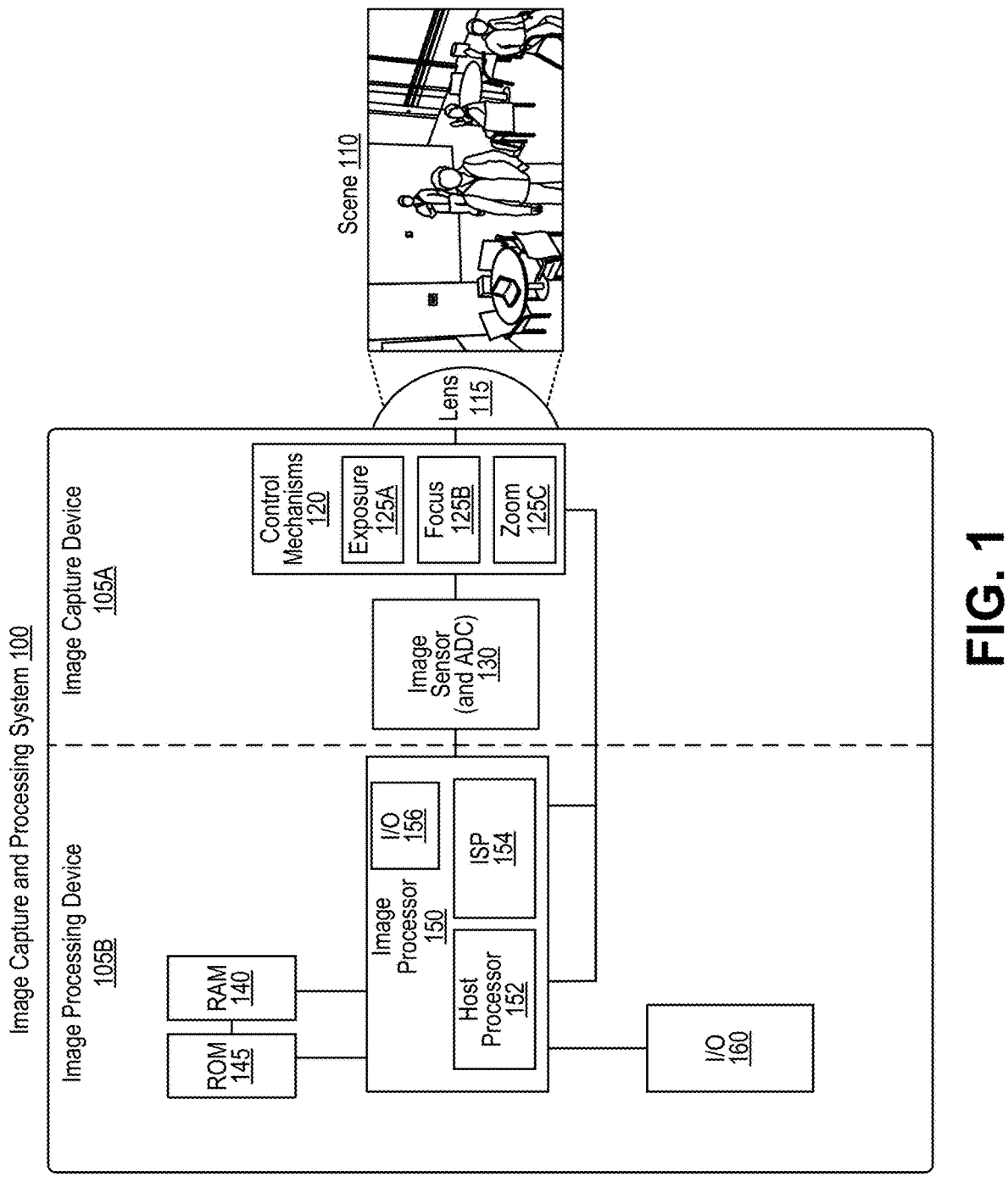
FIG. 1 is a block diagram illustrating an example architecture of an image capture and processing system, in accordance with some examples.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

A camera is a device that receives light and captures image frames, such as still images or video frames, using an image sensor. The terms "image," "image frame," and "frame" are used interchangeably herein. Cameras can be configured with a variety of image capture and image processing settings. The different settings result in images with different appearances. Some camera settings are determined and applied before or during capture of one or more image frames, such as ISO, exposure time, aperture size, f/stop, shutter speed, focus, and gain. For example, settings or parameters can be applied to an image sensor for capturing the one or more image frames. Other camera settings can configure post-processing of one or more image frames, such as alterations to contrast, brightness, saturation, sharpness, levels, curves, or colors. For example, settings or parameters can be applied to a processor (e.g., an image signal processor or ISP) for processing the one or more image frames captured by the image sensor.

Traditionally, ISP settings are set during camera calibration (e.g., during camera manufacturing) and do not change afterward. For example, traditional solutions use one ISP per context or per sensor. In some cases, however, different ISP settings may be better than others in different contexts and/or for different purposes. For instance, one set of ISP settings may be optimized to produce an image that is clear, sharp, realistic, and/or correctly colored based on human vision by one or more human viewers. Another set of ISP settings may be optimized to produce an image that is useful for a machine learning and/or computer vision algorithm, such as an algorithm for object detection, object recognition, and/or object tracking. In some cases, aspects such as white balance, tone mapping, color mapping, chromatic aberration correction (CAC), and lens distortion correction can be more important for human vision than computer vision. Which settings are optimal for computer vision may depend on the algorithm(s) used, and/or the training of a trained machine learning model used.

Imaging systems and techniques are described. An imaging system receives raw image data captured using an image sensor or multiple image sensors. The imaging system generates a first image using the raw image data at least in part by processing the raw image data using an image signal processor (ISP) according to a first ISP setting. The imaging system generates a second image using the raw image data at least in part by processing the raw image data using the ISP according to a second ISP setting that is distinct from the first ISP setting. In some examples, the first ISP setting is configured for human vision, while the second ISP setting is configured for computer vision. The imaging system outputs the first image and the second image, for instance by displaying the first image and conveying the second image to a machine learning model trained for computer vision.

The imaging systems and techniques described herein provide a number of technical improvements over prior imaging systems. For instance, the imaging systems and techniques described herein allow the same raw image data to be used to capture images that are optimized for different contexts. For instance, in the example of a camera of a vehicle, the raw image data captured by the vehicle may be captured as a first image according to a first set of ISP settings to show a realistic-looking image of the environment to the driver, but may also be captured as a second image according to a second set of ISP settings to pass to a computer vision algorithm to detect pedestrians, vehicles, and/or possible routes for the vehicle based on the image. The first image may have accurate colors and brightness levels, reduced lens distortion, and the like. The second image can instead be optimized to edge detection and contrast in certain types of features, to maximize the probability of accurately detecting an object. The imaging systems and techniques described herein provide for line-level interleaving, or frame-level interleaving, of imaging processes by an ISP, allowing the image capture to be performed sequentially, in parallel, or a combination thereof. In at least these ways, the imaging systems and techniques described herein provide efficient capture of the same raw image data according to different ISP settings for different contexts, and improve both usability for human users and functionality of computer vision systems.

Various aspects of the application will be described with respect to the figures. FIG. 1 is a block diagram illustrating an architecture of an image capture and processing system 100. The image capture and processing system 100 includes various components that are used to capture and process images of one or more scenes (e.g., an image of a scene 110). The image capture and processing system 100 can capture standalone images (or photographs) and/or can capture videos that include multiple images (or video frames) in a particular sequence. A lens 115 of the system 100 faces a scene 110 and receives light from the scene 110. The lens 115 bends the light toward the image sensor 130. The light received by the lens 115 passes through an aperture controlled by one or more control mechanisms 120 and is received by an image sensor 130. In some examples, the scene 110 is a scene in an environment. In some examples, the scene 110 is a scene of at least a portion of a user. For instance, the scene 110 can be a scene of one or both of the user's eyes, and/or at least a portion of the user's face.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo, thereby adjusting focus. In some cases, additional lenses may be included in the system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), or some combination thereof. The focus setting may be determined using the control mechanism 120, the image sensor 130, and/or the image processor 150. The focus setting may be referred to as an image capture setting and/or an image processing setting.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference) with a negative (e.g., diverging, concave) lens between them. In some cases, the zoom control mechanism 125C moves one or more of the lenses in the afocal zoom system, such as the negative lens and one or both of the positive lenses.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different color filters, and may thus measure light matching the color of the filter covering the photodiode. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter. Other types of color filters may use yellow, magenta, and/or cyan (also referred to as "emerald") color filters instead of or in addition to red, blue, and/or green color filters. Some image sensors may lack color filters altogether, and may instead use different photodiodes throughout the pixel array (in some cases vertically stacked). The different photodiodes throughout the pixel array can have different spectral sensitivity curves, therefore responding to different wavelengths of light. Monochrome image sensors may also lack color filters and therefore lack color depth.

In some cases, the image sensor 130 may alternately or additionally include opaque and/or reflective masks that block light from reaching certain photodiodes, or portions of certain photodiodes, at certain times and/or from certain angles, which may be used for phase detection autofocus (PDAF). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

The image processor 150 may include one or more processors, such as one or more image signal processors (ISPs) (including ISP 154), one or more host processors (including host processor 152), and/or one or more of any other type of processor 1110 discussed with respect to the computing system 1100. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140 and/or 1120, read-only memory (ROM) 145 and/or 1125, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices 1135, any other input devices 1145, or some combination thereof. In some cases, a caption may be input into the image processing device 105B through a physical keyboard or keypad of the I/O devices 160, or through a virtual keyboard or keypad of a touchscreen of the I/O devices 160. The I/O 160 may include one or more ports, jacks, or other connectors that enable a wired connection between the system 100 and one or more peripheral devices, over which the system 100 may receive data from the one or more peripheral device and/or transmit data to the one or more peripheral devices. The I/O 160 may include one or more wireless transceivers that enable a wireless connection between the system 100 and one or more peripheral devices, over which the system 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 1102.11 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

Figure 2:
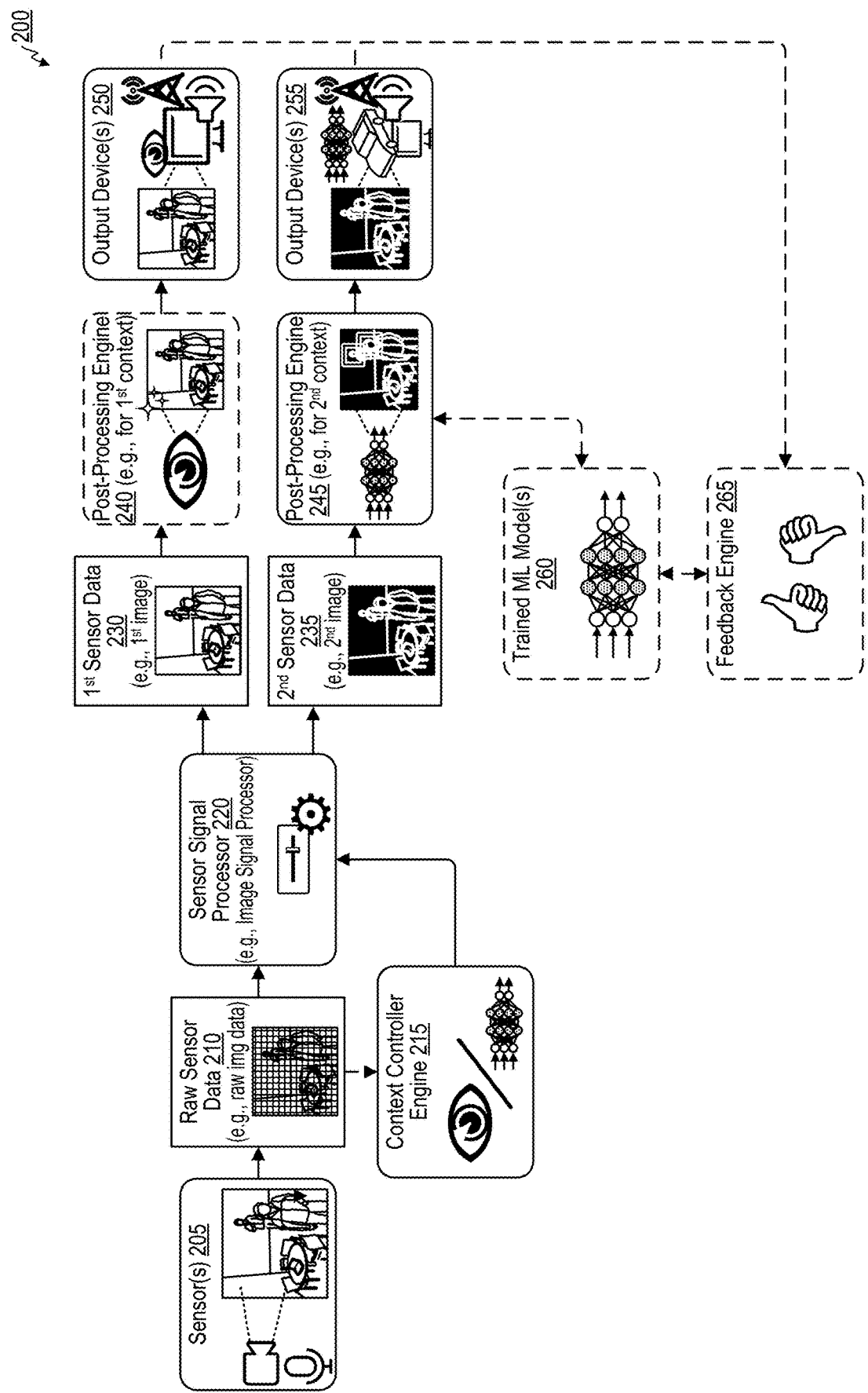
FIG. 2 is a block diagram illustrating an example architecture of a multi-context imaging process performed using an imaging system, in accordance with some examples.

FIG. 2 is a block diagram illustrating an example architecture of a multi-context imaging process performed using an imaging system 200. The imaging system 200 can include at least one of the image capture and processing system 100, the image capture device 105A, the image processing device 105B, the HMD 310, the mobile handset 410, the vehicle 510, the imaging system 600, the imaging system 700, the imaging system 800, the neural network 900, the imaging system that performs the imaging process 1000, the computing system 1100, or a combination thereof. In some examples, the imaging system 200 can include, for instance, one or more laptops, phones, tablet computers, mobile handsets, video game consoles, vehicle computers, desktop computers, wearable devices, televisions, media centers, XR systems, head-mounted display (HMD) devices, other types of computing devices discussed herein, or combinations thereof.

The imaging system 200 includes one or more sensors 205 configured to capture raw sensor data 210. In some examples, the sensor(s) 205 include one or more image sensors or one or more cameras. In some aspects, the sensor(s) 205 include multiple sensors. In some cases, each sensor of the multiple sensors can be asynchronous with respect to at least one other sensor of the multiple sensors (e.g., a first sensor of the multiple sensors is asynchronous with respect to a second, third, etc. sensor of the multiple sensors), or all of the sensors can be asynchronous with respect to one another. In some cases, at least two of the multiple sensors can be synchronous with respect to each other. In some examples, the frame rate and/or resolution of each sensor of the multiple sensors can be different from at least one other sensor of the multiple sensors, or all of the sensors can have different frame rates and/or resolutions.

In some examples, the raw sensor data 210 captured using the sensor(s) 205 includes raw image data, image data, pixel data, image frame(s), raw video data, video data, video frame(s), or a combination thereof. In some examples, at least one of the sensor(s) 205 can be directed toward a user (e.g., can face toward the user), and can thus capture sensor data (e.g., image data) of (e.g., depicting or otherwise representing) at least portion(s) of the user. In some examples, at least one of the sensor(s) 205 can be directed away from the user (e.g., can face away from the user) and/or toward an environment that the user is in, and can thus capture sensor data (e.g., image data) of (e.g., depicting or otherwise representing) at least portion(s) of the environment. In some examples, sensor data captured by at least one of the sensor(s) 205 that is directed away from the user and/or toward the can have a field of view (FoV) that includes, is included by, overlaps with, and/or otherwise corresponds to, a FoV of the eyes of the user. Within FIG. 2, a graphic representing the sensor(s) 205 illustrates the sensor(s) 205 as including a camera and a microphone facing an environment with two people in it. Within FIG. 2, a graphic representing the raw sensor data 210 illustrates a representation of the environment illustrates for the sensor(s) 205, divided up into data corresponding to different pixels and/or photodiodes of the sensor(s) 205.

In some examples, the sensor(s) 205 can include one or more cameras, image sensors, microphones, heart rate monitors, oximeters, biometric sensors, positioning receivers, Global Navigation Satellite System (GNSS) receivers, Inertial Measurement Units (IMUs), accelerometers, gyroscopes, gyrometers, barometers, thermometers, altimeters, depth sensors, light detection and ranging (LIDAR) sensors, radio detection and ranging (RADAR) sensors, sound detection and ranging (SODAR) sensors, sound navigation and ranging (SONAR) sensors, time of flight (ToF) sensors, structured light sensors, other sensors discussed herein, or combinations thereof. In some examples, the one or more sensors 205 include at least one image capture and processing system 100, image capture device 105A, image processing device 105B, or combination(s) thereof. In some examples, the one or more sensors 205 include at least one input device 1145 of the computing system 1100. In some implementations, one or more of the sensor(s) 205 may complement or refine sensor readings from other sensor(s) 205. For example, Inertial Measurement Units (IMUs), accelerometers, gyroscopes, or other sensors may be used to identify a pose (e.g., position and/or orientation) of the imaging system 200 and/or of the user in the environment, and/or the gaze of the user through the imaging system 200.

In some examples, the sensor(s) 205 capture sensor data measuring and/or tracking information about aspects of a user's body and/or behaviors by the user (e.g., characteristics of the user). In some examples, the sensor(s) 205 include one or more image sensors of one or more cameras that face at least a portion of the user (e.g., at least a portion of the face and/or head of the user). The one or more cameras can include one or more image sensors that capture image data including one or more images of at least a portion of the user. For instance, the sensor(s) 205 can include one or more image sensors focused on one or both eyes (and/or eyelids) of the user, with the image sensors of the cameras capturing image data of one or both eyes of the user. The one or more image sensors may also be referred to as eye capturing sensor(s). In some implementations, the one or more image sensors can capture image data that includes series of images over time, which in some examples may be sequenced together in temporal order, for instance into videos. These series of images can depict or otherwise indicate, for instance, movements of the user's eye(s), pupil dilations, blinking (using the eyelids), squinting (using the eyelids), saccades, fixations, eye moisture levels, optokinetic reflexes or responses, vestibulo-ocular reflexes or responses, accommodation reflexes or responses, other attributes related to eyes and/or eyelids described herein, or a combination thereof. The sensor(s) 205 can include one or more sensors that track information about the user and/or the environment, including pose (e.g., position and/or orientation) of the user and/or behaviors of the user.

The imaging system 200 includes a sensor signal processor 220 that is configured to receive the raw sensor data 210 from the sensor(s) 205. The sensor signal processor 220 processes the raw sensor data 210 to generate first sensor data 230 and second sensor data 235. In some examples, the sensor signal processor 220 includes an image signal processor (ISP), such as the ISP 154. In some examples, the sensor signal processor 220 includes an image processor 150, a host processor 152, an ISP 154, a processor 1110, or a combination thereof. In some examples, the sensor signal processor 220 processes the raw sensor data 210 according to various ISP settings that tune various ISP parameters. In some examples, ISP parameters can include brightness, color balance, tone mapping, sharpness, noise reduction, saturation, white balance, or combinations thereof. Different ISP settings for these ISP parameters can adjust application of these ISP parameters by the sensor signal processor 220 to the raw sensor data 210. For instance, use of a higher brightness ISP setting for the brightness ISP parameter can cause the sensor signal processor 220 that applies the brightness ISP parameter to increase brightness of the raw sensor data 210 more than a lower brightness ISP setting would. Within FIG. 2, a graphic representing the sensor signal processor 220 illustrates sliders representing selection of an ISP setting from different possible ISP settings for each ISP parameter, and a cog representing processing of the raw sensor data 210 according to the selected ISP settings for each ISP parameter.

The imaging system 200 includes a context controller engine 215. In some examples, the context controller engine receives the raw sensor data 210 from the sensor(s) 205. The context controller engine 215 identifies a context for generating sensor data (e.g., the first sensor data 230 or the second sensor data 235) from the raw sensor data 210. The context controller engine 215 can also identify or set different ISP settings for the different ISP parameters of the sensor signal processor 220 based on the different contexts. For instance, a first context may be associated with a first set of ISP settings for the ISP parameters of the sensor signal processor 220, a second context may be associated with a second set of ISP settings for the ISP parameters of the sensor signal processor 220, and so forth. Different contexts can include reasons for the sensor data to be generated, how the sensor data is to be output, how the sensor data is to be used after output, what the sensor data is to be used for after output, what the sensor data is to be used by after output, or a combination thereof.

In the example illustrated in FIG. 2, a first context includes generation of the first sensor data 230 (e.g., a first image) from the raw sensor data 210 so that the first sensor data 230 (in some cases with some post-processing using a post-processing engine 240) can be displayed using output device(s) 250 (e.g., a display screen) to one or more human viewers of the first sensor data 230. A first set of ISP settings associated with the first context can be optimized so that the first sensor data 230 appears, clear, sharp, realistic, and/or correctly colored based on human vision by one or more human viewers of the first sensor data 230.

In the example illustrated in FIG. 2, a second context includes generation of the second sensor data 235 (e.g., a second image) from the raw sensor data 210 so that the second sensor data 235 can be further processed by a computer for computer vision applications, for instance using one or more trained machine learning (ML) models 260, of a post-processing engine 245, and use and/or output using output device(s) 255. In some examples, the post-processing engine 245 can process the second sensor data 235 using the trained ML model(s) 260 perform, on the second sensor data 235, feature extraction, feature detection, feature recognition, feature tracking, object detection, object recognition, object tracking, face detection, face recognition, face tracking, person detection, person recognition, person tracking, vehicle detection, vehicle recognition, vehicle tracking, classification, computer vision, or a combination thereof. In some examples, the output device(s) 255 include a vehicle and/or one or more subsystems of a vehicle, such as advanced driver assistance systems (ADAS) of the vehicle, in-vehicle infotainment (IVI) systems of the vehicle, autonomous driving systems of the vehicle, semi-autonomous driving systems of the vehicle, a vehicle electronic control unit (ECU) 630, or a combination thereof.

In some examples, the sensor signal processor 220 processes the raw sensor data 210 according to the first set of ISP settings associated with the first context (e.g., human vision) identified to the sensor signal processor 220 by the context controller engine 215 to generate the first sensor data 230 (e.g., the first image). In some examples, the sensor signal processor 220 processes the raw sensor data 210 according to the second set of ISP settings associated with the second context (e.g., computer vision using the trained ML model(s) 260 and/or post-processing engine 245) identified to the sensor signal processor 220 by the context controller engine 215 to generate the second sensor data 235 (e.g., the second image). The first set of ISP settings can differ from the second set of ISP settings. Thus, the first sensor data 230 (e.g., the first image) can differ from the second sensor data 235 (e.g., the second image). For instance, in some examples, human vision can be more sensitive to brightness than color, while some computer vision systems are more equivalent in terms of sensitivity to brightness and color. Thus, the first set of ISP settings may adjust brightness and/or tone more than the second set of ISP settings. In some examples, human vision can be more sensitive to green than to other primary colors of light (e.g., red, green, and blue), while some computer vision systems are more equivalent in terms of sensitivity to the different primary colors of light. Thus, the first set of ISP settings may adjust the green color channel more than the second set of ISP settings. In some examples, some computer vision systems may not need color information whatsoever for a certain application, whereas human vision benefits from color in images. Thus, the first set of ISP settings may perform color-based filtering, while the second set of ISP settings may forego color-based filtering, or may even convert an image to greyscale. In some examples, certain imaging operations are more important for human vision for humans to be able to properly interpret an image, such as white balance, tone mapping, color space transforms (CSTs), chromatic aberration correction (CAC) (e.g., longitudinal chromatic aberration correction (LCAC)), lens distortion correction, or combinations thereof. Thus, the first set of ISP settings may perform stronger adjustments in these imaging operations than the second set of ISP settings, and in some examples the second set of ISP settings may omit some of these imaging operations. In some examples, the second set of ISP settings may be tuned at least in part based on the training and/or tuning of the post-processing engine 245 and/or the trained ML model(s) 260.

Within FIG. 2, a graphic representing the context controller engine 215 illustrates a slash between a human eyeball icon and a ML model icon. The human eyeball icon represents a first context with ISP settings optimized for display to, and viewing by, a human viewer. The ML model icon represents a second context with ISP settings optimized for further processing and/or use by an ML model for computing systems (e.g., ADAS, IVI, autonomous driving, and the like). Within FIG. 2, a graphic representing the first sensor data 230 illustrates a first image depicting the environment illustrated in the graphic representing the sensor(s) 205 using similar shading as illustrated in the graphic representing the sensor(s) 205, to indicate that the first sensor data 230 is optimized for human vision. Within FIG. 2, a graphic representing the second sensor data 235 illustrates a second image depicting the environment illustrated in the graphic representing the sensor(s) 205 using very different shading compared to the graphic representing the sensor(s) 205, to indicate that the second sensor data 235 is optimized for computer vision and may emphasize different aspects of the raw sensor data 210 than the first sensor data 230.

In some examples imaging system 200 can include a post-processing engine 240 associated with the first context, for applying post-generation processing to the first sensor data 230 (e.g., the first image). The post-processing engine 240 can adjust one or more image properties and/or other properties of the first sensor data 230, such as brightness, contrast, color balance, tone mapping, sharpness, noise reduction, saturation, white balance, or combinations thereof. The post-processing engine 240 can output the modified variant of the first sensor data 230 to output device(s) 250. In some examples, the imaging system 200 may be missing the post-processing engine 240, and the first sensor data 230 can be output directly to the output device(s) 250. Within FIG. 2, a graphic representing the post-processing engine 240 illustrates the first image depicted in the graphic representing the first sensor data 230, with sparkles in the corner representing new adjustments to image properties, and a human eye icon representing that the adjustments may modify the first sensor data 230 to further optimize the first sensor data 230 for display to, and/or viewing by, one or more human viewers.

The imaging system 200 can include a post-processing engine 245 associated with the second context. In some examples, the post-processing engine 245 applies post-generation processing to the second sensor data 235 (e.g., the second image), for instance to adjust one or more image properties and/or other properties of the second sensor data 235 as discussed with respect to the post-processing engine 240, for instance to further optimize the second sensor data 235 for use in computer vision application. In some examples, the post-processing engine 245 performs computer vision processing operation(s) on the second sensor data 235 (e.g., using the trained ML model(s) 260), such as feature extraction, feature detection, feature recognition, feature tracking, object detection, object recognition, object tracking, face detection, face recognition, face tracking, person detection, person recognition, person tracking, vehicle detection, vehicle recognition, vehicle tracking, classification, computer vision, or a combination thereof. For instance, the post-processing engine 245 can identify, detect, recognize, and/or track one or more features, objects, faces, people, vehicles, and the like, within the second sensor data 235. The post-processing engine 245 can output the second sensor data 235, with any modification(s) and/or additional elements (e.g., bounding boxes for identified features, objects, faces, people, vehicles, and the like) to output device(s) 255. In some examples, the output device(s) 255 include a vehicle and/or one or more subsystems of a vehicle, such as advanced driver assistance systems (ADAS) of the vehicle, in-vehicle infotainment (IVI) systems of the vehicle, autonomous driving systems of the vehicle, semi-autonomous driving systems of the vehicle, a vehicle electronic control unit (ECU) 630, or a combination thereof. Within FIG. 2, a graphic representing the post-processing engine 245 illustrates the second image depicted in the graphic representing the second sensor data 235, with bounding boxes overlaid representing detected positions of faces in the second image, and a ML model icon representing that trained ML model(s) 260 may be used to detect the faces and/or generate the bounding boxes to identify the positions of the faces in the second sensor data 235.

In some examples, the post-processing engine 245 inputs the second sensor data 235 into the trained ML model(s) 260 to detect, recognize, and/or track features, objects, faces, people, vehicles, and the like, in the second sensor data 235. The post-processing engine 245 and/or the trained ML model(s) 260 can output locations and/or areas in the second sensor data 235 where those elements (e.g., features, objects, faces, people, vehicles, and the like) are detected, can output recognized identities of those elements, can output tracked paths of those elements over time, and/or can output predicted paths of those elements based on the tracked paths of those elements. The trained machine learning (ML) model(s) 260 can be trained (e.g., by the imaging system 200) for use by the post-processing engine 245 using training data that includes sensor data (e.g., images) generated using the second set of ISP settings associated with the second context (e.g., as in the second sensor data 235) as well as determined locations of elements, areas including the elements, identities of the elements, tracked paths of the elements, predicted paths for the elements, or combinations thereof.

The imaging system 200 includes output device(s) 250 and output device(s) 255. The output device(s) 250-255 can include one or more visual output devices, such as display(s) or connector(s) therefor. The output device(s) 250-255 can include one or more audio output devices, such as speaker(s), headphone(s), and/or connector(s) therefor. The output device(s) 250-255 can include one or more of the output device 1135 and/or of the communication interface 1140 of the computing system 1100. In some examples, the imaging system 200 causes the display(s) of the output device(s) 250 to display the first sensor data 230, in some cases with modifications and/or processing by the post-processing engine 240 applied. In some examples, the imaging system 200 causes the display(s) of the output device(s) 255 to display the second sensor data 235, in some cases with modifications and/or processing by the post-processing engine 245 applied.

In some examples, the output device(s) 250-255 include one or more transceivers. The transceiver(s) can include wired transmitters, receivers, transceivers, or combinations thereof. The transceiver(s) can include wireless transmitters, receivers, transceivers, or combinations thereof. The transceiver(s) can include one or more of the output device 1135 and/or of the communication interface 1140 of the computing system 1100. In some examples, the imaging system 200 causes the transceiver(s) to send, to a recipient device, the first sensor data 230, in some cases with modifications and/or processing by the post-processing engine 240 applied. In some examples, the imaging system 200 causes the transceiver(s) to send, to a recipient device, the second sensor data 235, in some cases with modifications and/or processing by the post-processing engine 245 applied. In some examples, the recipient device can include an HMD 310, a mobile handset 410, a vehicle 510, a vehicle ECU 630, a computing system 1100, or a combination thereof. In some examples, the recipient device can include a display, and the data sent to the recipient device from the transceiver(s) of the output device(s) 250-255 can cause the display of the recipient device to display the first sensor data 230 (e.g., with processing by the post-processing engine 240 applied) and/or the second sensor data 235 (e.g., with processing by the post-processing engine 245 applied).

In some examples, the display(s) of the output device(s) 250-255 of the imaging system 200 function as optical "see-through" display(s) that allow light from the real-world environment (scene) around the imaging system 200 to traverse (e.g., pass) through the display(s) of the output device(s) 250-255 to reach one or both eyes of the user. For example, the display(s) of the output device(s) 250-255 can be at least partially transparent, translucent, light-permissive, light-transmissive, or a combination thereof. In an illustrative example, the display(s) of the output device(s) 250-255 includes a transparent, translucent, and/or light-transmissive lens and a projector. The display(s) of the output device(s) 250-255 of can include a projector that projects virtual content (e.g., the first sensor data 230, the second sensor data 235, processing elements associated with the post-processing engine 240, and/or processing elements associated with the post-processing engine 245) onto the lens. The lens may be, for example, a lens of a pair of glasses, a lens of a goggle, a contact lens, a lens of a head-mounted display (HMD) device, or a combination thereof. Light from the real-world environment passes through the lens and reaches one or both eyes of the user. The projector can project virtual content (e.g., the first sensor data 230, the second sensor data 235, processing elements associated with the post-processing engine 240, and/or processing elements associated with the post-processing engine 245) onto the lens, causing the virtual content to appear to be overlaid over the user's view of the environment from the perspective of one or both of the user's eyes. In some examples, the projector can project the virtual content onto the onto one or both retinas of one or both eyes of the user rather than onto a lens, which may be referred to as a virtual retinal display (VRD), a retinal scan display (RSD), or a retinal projector (RP) display.

In some examples, the display(s) of the output device(s) 250-255 of the imaging system 200 are digital "pass-through" display that allow the user of the imaging system 200 and/or a recipient device to see a view of an environment by displaying the view of the environment on the display(s) of the output device(s) 250-255. The view of the environment that is displayed on the digital pass-through display can be a view of the real-world environment around the imaging system 200, for example based on sensor data (e.g., images, videos, depth images, point clouds, other depth data, or combinations thereof) captured by one or more environment-facing sensors of the sensor(s) 205 (e.g., the first sensor data 230, the second sensor data 235, processing elements associated with the post-processing engine 240, and/or processing elements associated with the post-processing engine 245). The view of the environment that is displayed on the digital pass-through display can be a virtual environment (e.g., as in VR), which may in some cases include elements that are based on the real-world environment (e.g., boundaries of a room). The view of the environment that is displayed on the digital pass-through display can be an augmented environment (e.g., as in AR) that is based on the real-world environment. The view of the environment that is displayed on the digital pass-through display can be a mixed environment (e.g., as in MR) that is based on the real-world environment. The view of the environment that is displayed on the digital pass-through display can include virtual content (e.g., the first sensor data 230, the second sensor data 235, processing elements associated with the post-processing engine 240, and/or processing elements associated with the post-processing engine 245) overlaid over other otherwise incorporated into the view of the environment.

Within FIG. 2, a graphic representing the output device(s) 250 illustrates a display, a speaker, and a wireless transceiver, outputting the first image illustrated in the graphics representing the first sensor data 230 and the post-processing engine 240, with a human eye icon representing that the output device(s) 250 are configured to output to human viewers so that human viewers can access the output(s) of the output device(s) 250. Within FIG. 2, a graphic representing the output device(s) 255 illustrates a display, a speaker, a wireless transceiver, and a vehicle, outputting the second image illustrated in the graphics representing the second sensor data 235 and the post-processing engine 245, with the vehicle and the ML model icon representing that the output device(s) 255 are configured to apply computer vision analyses to the output(s) and/or use the output(s) for controlling computing systems such as an ADAS of the vehicle, IVI systems of the vehicle, autonomous driving systems of the vehicle, semi-autonomous driving systems of the vehicle, the vehicle ECU 630, or a combination thereof.

The trained ML model(s) 260 can include one or more neural network (NNs) (e.g., neural network 900), one or more convolutional neural networks (CNNs), one or more trained time delay neural networks (TDNNs), one or more deep networks, one or more autoencoders, one or more deep belief nets (DBNs), one or more recurrent neural networks (RNNs), one or more generative adversarial networks (GANs), one or more conditional generative adversarial networks (cGANs), one or more other types of neural networks, one or more trained support vector machines (SVMs), one or more trained random forests (RFs), one or more computer vision systems, one or more deep learning systems, one or more classifiers, one or more transformers, or combinations thereof. Within FIG. 2, a graphic representing the trained ML model(s) 260 illustrates a set of circles connected to another. Each of the circles can represent a node (e.g., node 916), a neuron, a perceptron, a layer, a portion thereof, or a combination thereof. The circles are arranged in columns. The leftmost column of white circles represent an input layer (e.g., input layer 910). The rightmost column of white circles represent an output layer (e.g., output layer 914). Two columns of shaded circled between the leftmost column of white circles and the rightmost column of white circles each represent hidden layers (e.g., hidden layers 912A-912N).

In some examples, the imaging system 200 includes a feedback engine 265 of the imaging system 200. The feedback engine 265 can detect feedback received from a user interface of the imaging system 200. The feedback may include feedback on output(s) of the output device(s) 250-255 (e.g., the first sensor data 230, the second sensor data 235, processing elements associated with the post-processing engine 240, and/or processing elements associated with the post-processing engine 245). The feedback engine 265 can detect feedback about one engine of the imaging system 200 received from another engine of the imaging system 200, for instance whether one engine decides to use data from the other engine or not. For example, the feedback engine 265 can detect whether the output device(s) 255 (e.g., vehicle subsystems) decide to use data (e.g., detection, recognition, and/or tracking of an object) generated by the post-processing engine 245. The feedback received by the feedback engine 265 can be positive feedback or negative feedback. For instance, if the one engine of the imaging system 200 uses data from another engine of the imaging system 200, or if positive feedback from a user is received through a user interface, the feedback engine 265 can interpret this as positive feedback. If the one engine of the imaging system 200 declines to data from another engine of the imaging system 200, or if negative feedback from a user is received through a user interface, the feedback engine 265 can interpret this as negative feedback. Positive feedback can also be based on attributes of the sensor data from the sensor(s) 205, such as the user smiling, laughing, nodding, saying a positive statement (e.g., "yes," "confirmed," "okay," "next"), or otherwise positively reacting to an output of one of the engines described herein, or an indication thereof. Negative feedback can also be based on attributes of the sensor data from the sensor(s) 205, such as the user frowning, crying, shaking their head (e.g., in a "no" motion), saying a negative statement (e.g., "no," "negative," "bad," "not this"), or otherwise negatively reacting to an output of one of the engines described herein, or an indication thereof.

In some examples, the feedback engine 265 provides the feedback to one or more ML systems (e.g., the post-processing engine 245) of the imaging system 200 as training data to update the one or more trained ML model(s) 260 of the imaging system 200. For instance, the feedback engine 265 can provide the feedback as training data to the ML system(s) and/or the trained ML model(s) 260 to update the training for the post-processing engine 245, the trained ML model(s) 260, or a combination thereof. Positive feedback can be used to strengthen and/or reinforce weights associated with the outputs of the ML system(s) and/or the trained ML model(s) 260, and/or to weaken or remove other weights other than those associated with the outputs of the ML system(s) and/or the trained ML model(s) 260. Negative feedback can be used to weaken and/or remove weights associated with the outputs of the ML system(s) and/or the trained ML model(s) 260, and/or to strengthen and/or reinforce other weights other than those associated with the outputs of the ML system(s) and/or the trained ML model(s) 260.

It should be understood that references herein to the sensor(s) 205, and other sensors described herein, as images sensors should be understood to also include other types of sensors that can produce outputs in image form, such as depth sensors that produce depth images and/or point clouds that can be expressed in image form and/or rendered images of 3D models (e.g., RADAR, LIDAR, SONAR, SODAR, ToF, structured light). It should be understood that references herein to image data, and/or to images, produced by such sensors can include any sensor data that can be output in image form, such as depth images, point clouds that can be expressed in image form, and/or rendered images of 3D models.

In some examples, certain elements of the imaging system 200 (e.g., the context controller engine 215, the sensor signal processor 220, the post-processing engine 240, the post-processing engine 245, the output device(s) 250, the output device(s) 255, the trained ML model(s) 260, the feedback engine 265, or a combination thereof) include a software element, such as a set of instructions corresponding to a program, that is run on a processor such as the processor 1110 of the computing system 1100, the image processor 150, the host processor 152, the ISP 154, or a combination thereof. In some examples, one or more of these elements of the imaging system 200 can include one or more hardware elements, such as a specialized processor (e.g., the processor 1110 of the computing system 1100, the image processor 150, the host processor 152, the ISP 154, or a combination thereof). In some examples, one or more of these elements of the imaging system 200 can include a combination of one or more software elements and one or more hardware elements.

Figure 3A:
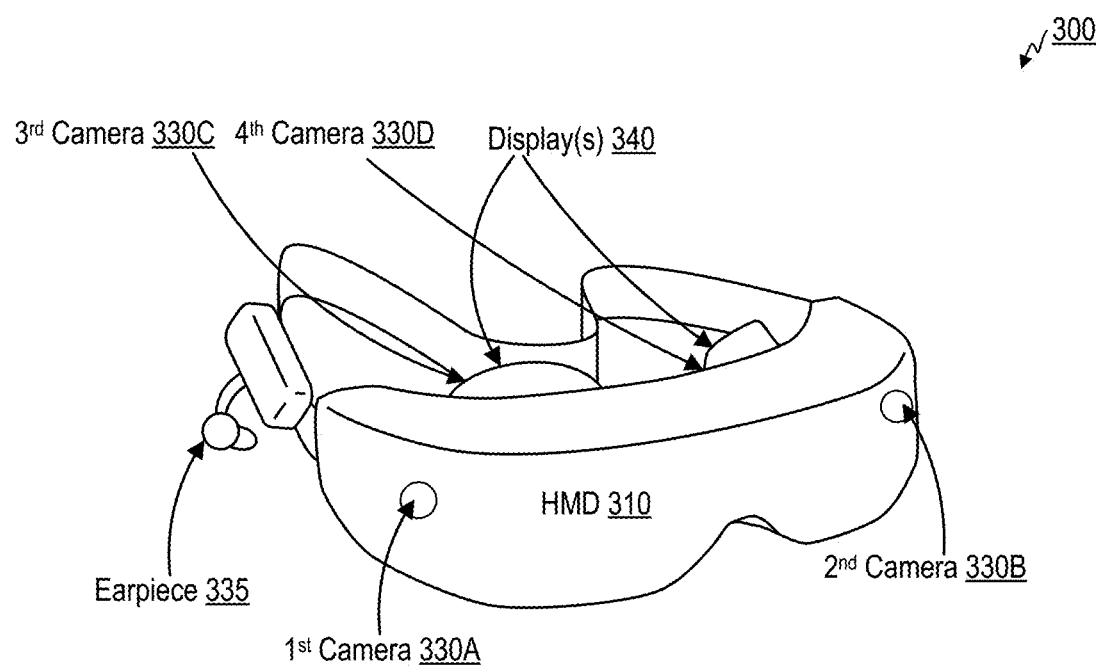
FIG. 3A is a perspective diagram illustrating a head-mounted display (HMD) that is used as part of an imaging system, in accordance with some examples.

FIG. 3A is a perspective diagram 300 illustrating a head-mounted display (TIMID) 310 that is used as part of an imaging system 200. The HMD 310 may be, for example, an augmented reality (AR) headset, a virtual reality (VR) headset, a mixed reality (MR) headset, an extended reality (XR) headset, or some combination thereof. The HMD 310 may be an example of an imaging system 200. The HMD 310 includes a first camera 330A and a second camera 330B along a front portion of the HMD 310. The first camera 330A and the second camera 330B may be examples of the sensor(s) 205 of the imaging systems 200-200B. The HMD 310 includes a third camera 330C and a fourth camera 330D facing the eye(s) of the user as the eye(s) of the user face the display(s) 340. The third camera 330C and the fourth camera 330D may be examples of the sensor(s) 205 of the imaging systems 200-200B. In some examples, the HMD 310 may only have a single camera with a single image sensor. In some examples, the HMD 310 may include one or more additional cameras in addition to the first camera 330A, the second camera 330B, third camera 330C, and the fourth camera 330D. In some examples, the HMD 310 may include one or more additional sensors in addition to the first camera 330A, the second camera 330B, third camera 330C, and the fourth camera 330D, which may also include other types of sensor(s) 205 of the imaging system 200. In some examples, the first camera 330A, the second camera 330B, third camera 330C, and/or the fourth camera 330D may be examples of the image capture and processing system 100, the image capture device 105A, the image processing device 105B, or a combination thereof.

The HMD 310 may include one or more displays 340 that are visible to a user 320 wearing the HMD 310 on the user 320's head. The one or more displays 340 of the HMD 310 can be examples of the one or more displays of the output device(s) 250-255 of the imaging systems 200-200B. In some examples, the HMD 310 may include one display 340 and two viewfinders. The two viewfinders can include a left viewfinder for the user 320's left eye and a right viewfinder for the user 320's right eye. The left viewfinder can be oriented so that the left eye of the user 320 sees a left side of the display. The right viewfinder can be oriented so that the right eye of the user 320 sees a right side of the display. In some examples, the HMD 310 may include two displays 340, including a left display that displays content to the user 320's left eye and a right display that displays content to a user 320's right eye. The one or more displays 340 of the HMD 310 can be digital "pass-through" displays or optical "see-through" displays.

Figure 3B:
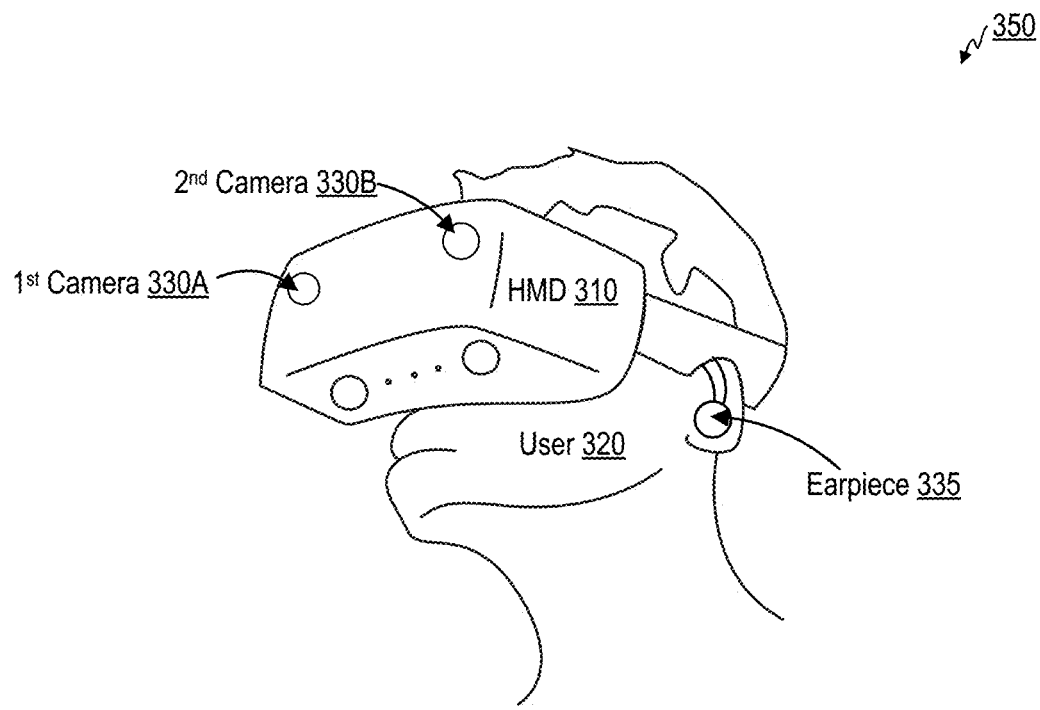
FIG. 3B is a perspective diagram illustrating the head-mounted display (HMD) of FIG. 3A being worn by a user, in accordance with some examples.

The HMD 310 may include one or more earpieces 335, which may function as speakers and/or headphones that output audio to one or more ears of a user of the HMD 310, and may be examples of output device(s) 250-255. One earpiece 335 is illustrated in FIGS. 3A and 3B, but it should be understood that the HMD 310 can include two earpieces, with one earpiece for each ear (left ear and right ear) of the user. In some examples, the HMD 310 can also include one or more microphones (not pictured). The one or more microphones can be examples of the sensor(s) 205 of the imaging systems 200-200B. In some examples, the audio output by the HMD 310 to the user through the one or more earpieces 335 may include, or be based on, audio recorded using the one or more microphones.

FIG. 3B is a perspective diagram 350 illustrating the head-mounted display (HMD) of FIG. 3A being worn by a user 320. The user 320 wears the HMD 310 on the user 320's head over the user 320's eyes. The HMD 310 can capture images with the first camera 330A and the second camera 330B. In some examples, the HMD 310 displays one or more output images toward the user 320's eyes using the display(s) 340. In some examples, the output images can include the first sensor data 230, the second sensor data 235, processing elements associated with the post-processing engine 240, and/or processing elements associated with the post-processing engine 245. The output images can be based on the images captured by the first camera 330A and the second camera 330B (e.g., the raw sensor data 210, the first sensor data 230, the second sensor data 235), for example with the virtual content (e.g., processing elements associated with the post-processing engine 240 and/or processing elements associated with the post-processing engine 245) overlaid. The output images may provide a stereoscopic view of the environment, in some cases with the virtual content overlaid and/or with other modifications. For example, the HMD 310 can display a first display image to the user 320's right eye, the first display image based on an image captured by the first camera 330A. The HMD 310 can display a second display image to the user 320's left eye, the second display image based on an image captured by the second camera 330B. For instance, the HMD 310 may provide overlaid virtual content in the display images overlaid over the images captured by the first camera 330A and the second camera 330B. The third camera 330C and the fourth camera 330D can capture images of the eyes of the before, during, and/or after the user views the display images displayed by the display(s) 340. This way, the sensor data from the third camera 330C and/or the fourth camera 330D can capture reactions to the virtual content by the user's eyes (and/or other portions of the user). An earpiece 335 of the HMD 310 is illustrated in an ear of the user 320. The HMD 310 may be outputting audio to the user 320 through the earpiece 335 and/or through another earpiece (not pictured) of the HMD 310 that is in the other ear (not pictured) of the user 320.

Figure 4A:
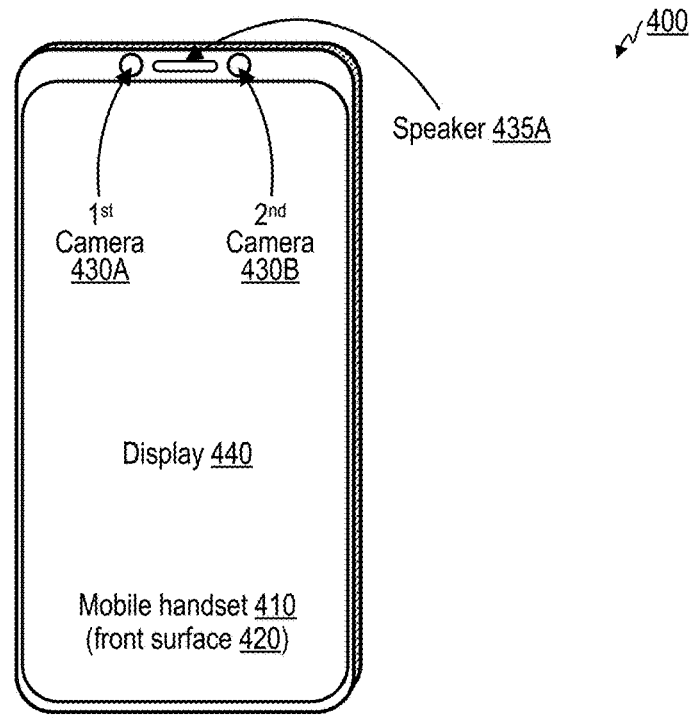
FIG. 4A is a perspective diagram illustrating a front surface of a mobile handset that includes front-facing cameras and that can be used as part of an imaging system, in accordance with some examples.

FIG. 4A is a perspective diagram 400 illustrating a front surface of a mobile handset 410 that includes front-facing cameras and can be used as part of an imaging system 200. The mobile handset 410 may be an example of an imaging system 200. The mobile handset 410 may be, for example, a cellular telephone, a satellite phone, a portable gaming console, a music player, a health tracking device, a wearable device, a wireless communication device, a laptop, a mobile device, any other type of computing device or computing system discussed herein, or a combination thereof.

The front surface 420 of the mobile handset 410 includes a display 440. The front surface 420 of the mobile handset 410 includes a first camera 430A and a second camera 430B. The first camera 430A and the second camera 430B may be examples of the sensor(s) 205 of the imaging systems 200-200B. The first camera 430A and the second camera 430B can face the user, including the eye(s) of the user, while content (e.g., the first sensor data 230, the second sensor data 235, processing elements associated with the post-processing engine 240, and/or processing elements associated with the post-processing engine 245) is displayed on the display 440. The display 440 may be an example of the display(s) of the output device(s) 250-255 of the imaging systems 200-200B.

The first camera 430A and the second camera 430B are illustrated in a bezel around the display 440 on the front surface 420 of the mobile handset 410. In some examples, the first camera 430A and the second camera 430B can be positioned in a notch or cutout that is cut out from the display 440 on the front surface 420 of the mobile handset 410. In some examples, the first camera 430A and the second camera 430B can be under-display cameras that are positioned between the display 440 and the rest of the mobile handset 410, so that light passes through a portion of the display 440 before reaching the first camera 430A and the second camera 430B. The first camera 430A and the second camera 430B of the perspective diagram 400 are front-facing cameras. The first camera 430A and the second camera 430B face a direction perpendicular to a planar surface of the front surface 420 of the mobile handset 410. The first camera 430A and the second camera 430B may be two of the one or more cameras of the mobile handset 410. In some examples, the front surface 420 of the mobile handset 410 may only have a single camera.

In some examples, the display 440 of the mobile handset 410 displays one or more output images toward the user using the mobile handset 410. In some examples, the output images can include the first sensor data 230, the second sensor data 235, processing elements associated with the post-processing engine 240, and/or processing elements associated with the post-processing engine 245. The output images can be based on the images (e.g., the raw sensor data 210, the first sensor data 230, the second sensor data 235) captured by the first camera 430A, the second camera 430B, the third camera 430C, and/or the fourth camera 430D, for example with the virtual content (e.g., the post-processing engine 240 and/or processing elements associated with the post-processing engine 245) overlaid.

In some examples, the front surface 420 of the mobile handset 410 may include one or more additional cameras in addition to the first camera 430A and the second camera 430B. The one or more additional cameras may also be examples of the sensor(s) 205 of the imaging systems 200-200B. In some examples, the front surface 420 of the mobile handset 410 may include one or more additional sensors in addition to the first camera 430A and the second camera 430B. The one or more additional sensors may also be examples of the sensor(s) 205 of the imaging systems 200-200B. In some cases, the front surface 420 of the mobile handset 410 includes more than one display 440. The one or more displays 440 of the front surface 420 of the mobile handset 410 can be examples of the display(s) of the output device(s) 250-255 of the imaging systems 200-200B. For example, the one or more displays 440 can include one or more touchscreen displays.

The mobile handset 410 may include one or more speakers 435A and/or other audio output devices (e.g., earphones or headphones or connectors thereto), which can output audio to one or more ears of a user of the mobile handset 410. One speaker 435A is illustrated in FIG. 4A, but it should be understood that the mobile handset 410 can include more than one speaker and/or other audio device. In some examples, the mobile handset 410 can also include one or more microphones (not pictured). The one or more microphones can be examples of the sensor(s) 205 of the imaging systems 200-200B. In some examples, the mobile handset 410 can include one or more microphones along and/or adjacent to the front surface 420 of the mobile handset 410, with these microphones being examples of the sensor(s) 205 of the imaging systems 200-200B. In some examples, the audio output by the mobile handset 410 to the user through the one or more speakers 435A and/or other audio output devices may include, or be based on, audio recorded using the one or more microphones.

Figure 4B:
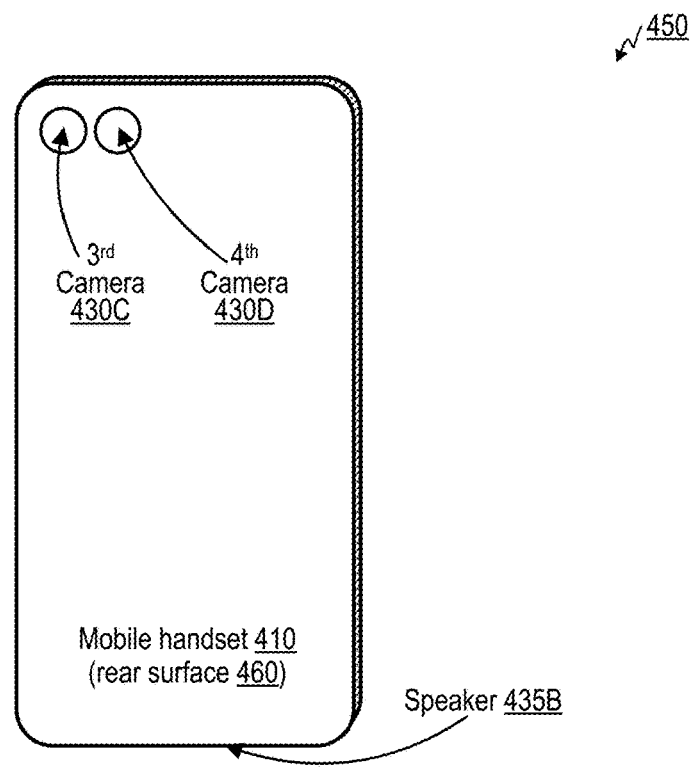
FIG. 4B is a perspective diagram illustrating a rear surface of a mobile handset that includes rear-facing cameras and that can be used as part of an imaging system, in accordance with some examples.

FIG. 4B is a perspective diagram 450 illustrating a rear surface 460 of a mobile handset that includes rear-facing cameras and that can be used as part of an imaging system 200. The mobile handset 410 includes a third camera 430C and a fourth camera 430D on the rear surface 460 of the mobile handset 410. The third camera 430C and the fourth camera 430D of the perspective diagram 450 are rear-facing. The third camera 430C and the fourth camera 430D may be examples of the sensor(s) 205 of the imaging systems 200-200B of FIG. 2. The third camera 430C and the fourth camera 430D face a direction perpendicular to a planar surface of the rear surface 460 of the mobile handset 410.

The third camera 430C and the fourth camera 430D may be two of the one or more cameras of the mobile handset 410. In some examples, the rear surface 460 of the mobile handset 410 may only have a single camera. In some examples, the rear surface 460 of the mobile handset 410 may include one or more additional cameras in addition to the third camera 430C and the fourth camera 430D. The one or more additional cameras may also be examples of the sensor(s) 205 of the imaging systems 200-200B. In some examples, the rear surface 460 of the mobile handset 410 may include one or more additional sensors in addition to the third camera 430C and the fourth camera 430D. The one or more additional sensors may also be examples of the sensor(s) 205 of the imaging systems 200-200B. In some examples, the first camera 430A, the second camera 430B, third camera 430C, and/or the fourth camera 430D may be examples of the image capture and processing system 100, the image capture device 105A, the image processing device 105B, or a combination thereof.

The mobile handset 410 may include one or more speakers 435B and/or other audio output devices (e.g., earphones or headphones or connectors thereto), which can output audio to one or more ears of a user of the mobile handset 410. One speaker 435B is illustrated in FIG. 4B, but it should be understood that the mobile handset 410 can include more than one speaker and/or other audio device. In some examples, the mobile handset 410 can also include one or more microphones (not pictured). The one or more microphones can be examples of the sensor(s) 205 of the imaging systems 200-200B. In some examples, the mobile handset 410 can include one or more microphones along and/or adjacent to the rear surface 460 of the mobile handset 410, with these microphones being examples of the sensor(s) 205 of the imaging systems 200-200B. In some examples, the audio output by the mobile handset 410 to the user through the one or more speakers 435B and/or other audio output devices may include, or be based on, audio recorded using the one or more microphones.

The mobile handset 410 may use the display 440 on the front surface 420 as a pass-through display. For instance, the display 440 may display output images, such as the first sensor data 230, the second sensor data 235, processing elements associated with the post-processing engine 240, and/or processing elements associated with the post-processing engine 245. The output images can be based on the images (e.g. raw sensor data 210, first sensor data 230, and/or second sensor data 235) captured by the third camera 430C and/or the fourth camera 430D, for example with the virtual content (e.g., processing elements associated with the post-processing engine 240 and/or processing elements associated with the post-processing engine 245). The first camera 430A and/or the second camera 430B can capture images of the user's eyes (and/or other portions of the user) before, during, and/or after the display of the output images with the virtual content on the display 440. This way, the sensor data from the first camera 430A and/or the second camera 430B can capture reactions to the virtual content by the user's eyes (and/or other portions of the user).

Figure 5:
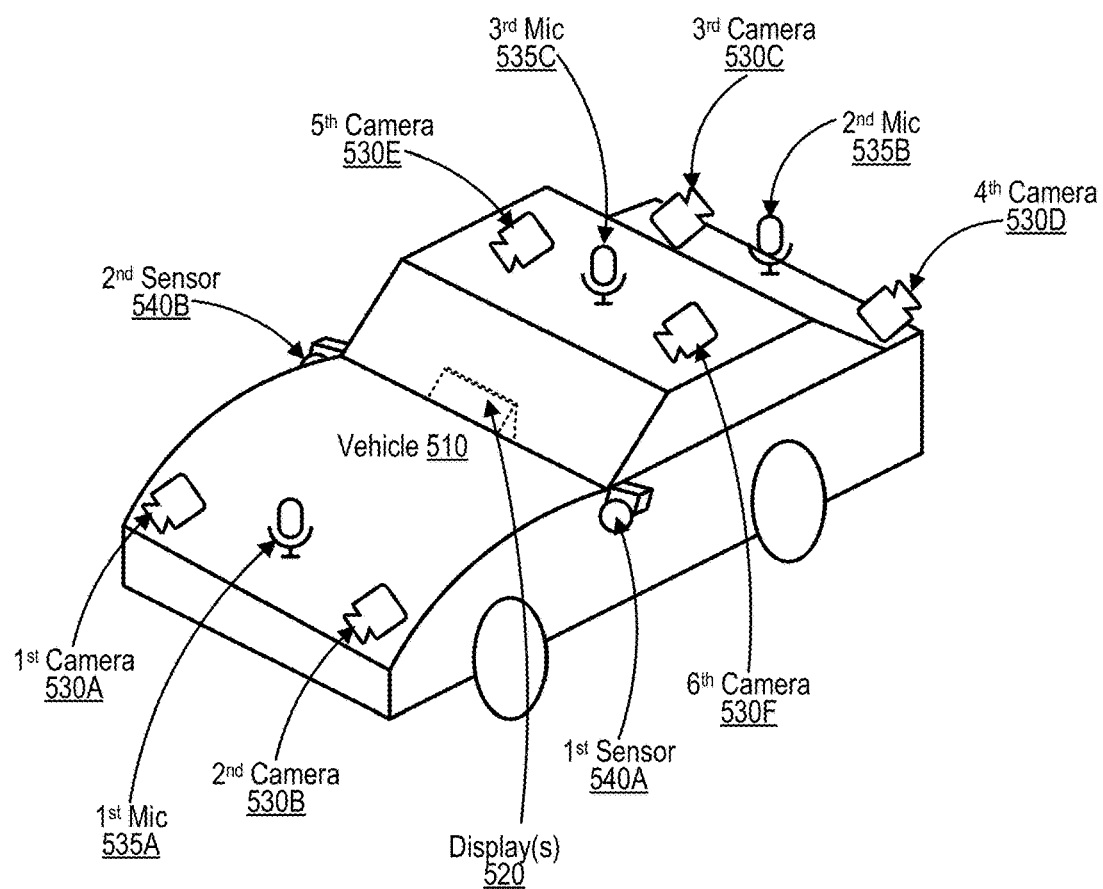
FIG. 5 is a perspective diagram illustrating a vehicle that includes various sensors, in accordance with some examples.

FIG. 5 is a perspective diagram 500 illustrating a vehicle 510 that includes various sensors. The vehicle 510 may be an example of an imaging system 200. The vehicle 510 may be, for example, an automobile, a truck, a bus, a train, a ground-based vehicle, an airplane, a helicopter, an aircraft, an aerial vehicle, a boat, a submarine, a watercraft, an underwater vehicle, a hovercraft, or a combination thereof. In some examples, the vehicle 510 may be manned. In some examples, the vehicle 510 may be unmanned, autonomous, and/or semi-autonomous. In some examples, the vehicle may be at least partially controlled and/or used with subsystems of the vehicle 510, such as ADAS of the vehicle 510, IVI systems of the vehicle 510, autonomous driving systems of the vehicle 510, semi-autonomous driving systems of the vehicle 510, a vehicle electronic control unit (ECU) 630 of the vehicle 510, or a combination thereof.

The vehicle 510 includes a display 520. The vehicle 510 includes various sensors, all of which can be examples of the sensor(s) 205. The vehicle 510 includes a first camera 530A and a second camera 530B at the front, a third camera 530C and a fourth camera 530D at the rear, and a fifth camera 530E and a sixth camera 530F on the top. The vehicle 510 includes a first microphone 535A at the front, a second microphone 535B at the rear, and a third microphone 535C at the top. The vehicle 510 includes a first sensor 540A on one side (e.g., adjacent to one rear-view mirror) and a second sensor 540B on another side (e.g., adjacent to another rear-view mirror). The first sensor 540A and the second sensor 540B may include cameras, microphones, RADAR sensors, LIDAR sensors, or any other types of sensors(s) 205 described herein. In some examples, the vehicle 510 may include additional sensor(s) 205 in addition to the sensors illustrated in FIG. 5. In some examples, the vehicle 510 may be missing some of the sensors that are illustrated in FIG. 5.

In some examples, the display 520 of the vehicle 510 displays one or more output images toward a user of the vehicle 510 (e.g., a driver and/or one or more passengers of the vehicle 510). In some examples, the output images can include the first sensor data 230, the second sensor data 235, processing elements associated with the post-processing engine 240, and/or processing elements associated with the post-processing engine 245. The output images can be based on the images (e.g., the raw sensor data 210, the first sensor data 230, the second sensor data 235) captured by the first camera 530A, the second camera 530B, the third camera 530C, the fourth camera 530D, the fifth camera 530E, the sixth camera 530F, the first sensor 540A, and/or the second sensor 540B, for example with the virtual content (e.g., the post-processing engine 240 and/or processing elements associated with the post-processing engine 245) overlaid.

Figure 6:
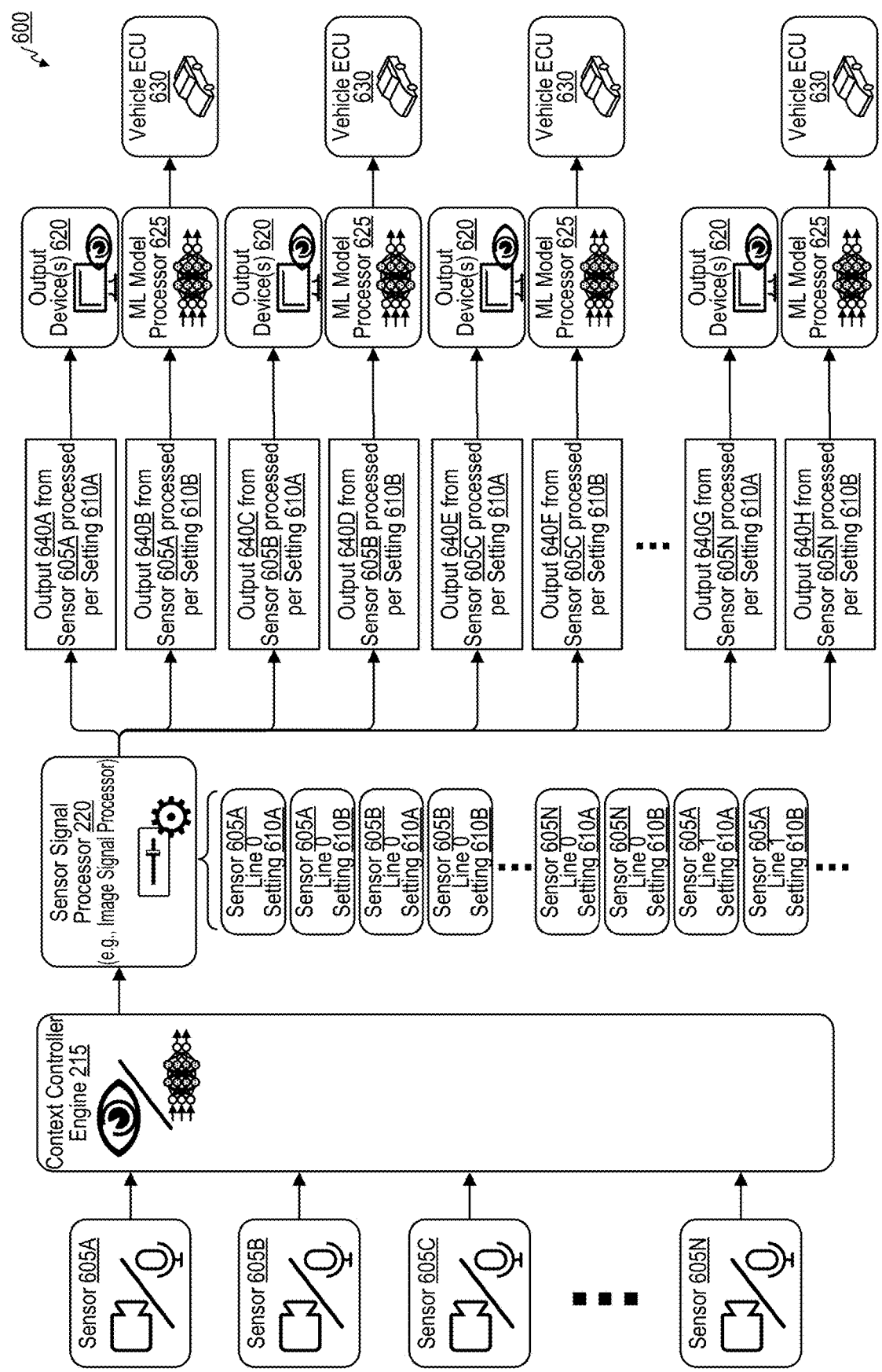
FIG. 6 is a block diagram illustrating a line-interleaved multi-sensor multi-context imaging process performed using an imaging system, in accordance with some examples.

FIG. 6 is a block diagram illustrating a line-interleaved multi-sensor multi-context imaging process performed using an imaging system 600. The imaging system 600 includes multiple sensors 605A-605N. Each of the sensors 605A-605N is an example of the sensor(s) 205. In some examples, the sensors 605A-605N are image sensors, such as the image sensor 130. In some aspects, each sensor of the sensors 605A-605N can be asynchronous with respect to at least one other sensor of the sensors 605A-605N. In some aspects, all of the sensors 605A-605N can be asynchronous with respect to one another. In some cases, at least two of the sensors 605A-605N can be synchronous with respect to each other. In some examples, the frame rate and/or resolution of each sensor of the sensors 605A-605N can be different from at least one other sensor of the multiple sensors, or all of the sensors 605A-605N can have different frame rates and/or resolutions.

The imaging system 600 includes the context controller engine 215 and the sensor signal processor 220 as described with respect to FIG. 2. In some examples, the sensor signal processor 220 is an ISP, such as the ISP 154. The context controller engine 215 can select settings corresponding to different contexts. In some examples, a first setting 610A corresponds to a first context configured for human vision. In some examples, a second setting 610B corresponds to a first context configured for computer vision.

In some examples, the sensor signal processor 220 processes sensor data (e.g., image data) from the sensors 605A-605N one portion (e.g., one line) at a time. In some examples, the sensor signal processor 220 processes sensor data (e.g., image data) from the sensors 605A-605N in an interleaved fashion, so that the sensor signal processor 220 processes corresponding portions (e.g., lines) of sensor data from different sensors 605A-605N interleaved between one another, and/or so that the sensor signal processor 220 processes corresponding portions (e.g., lines) of sensor data with different settings (e.g., the first setting 610A and the second setting 610B) interleaved between one another. For instance, an example line-interleaved order of processing operations by the sensor signal processor 220 is illustrated below the sensor signal processor 220 in FIG. 6. The interleaved order of processing operations by the sensor signal processor 220 indicates that the sensor signal processor 220 processes line 0 of sensor data from sensor 605A according to the first setting 610A, then processes line 0 of sensor data from sensor 605A according to the second setting 610B, then processes line 0 of sensor data from sensor 605B according to the first setting 610A, then processes line 0 of sensor data from sensor 605B according to the second setting 610B, processes line 0 of sensor data from sensor 605C according to the first setting 610A, then processes line 0 of sensor data from sensor 605C according to the second setting 610B, and so forth until processing line 0 of sensor data from sensor 605N according to the first setting 610A, then processes line 0 of sensor data from sensor 605N according to the second setting 610B, then moves from line 0 to line 1 to process line 1 of sensor data from sensor 605A according to the first setting 610A, then processes line 1 of sensor data from sensor 605A according to the second setting 610B, and so forth.

The sensor signal processor 220 eventually generates an output 640A from sensor 605A processed according to the first setting 610A, which is output using output device(s) 620. The output device(s) 620 are examples of the post-processing engine 240 and/or the output device(s) 250. The sensor signal processor 220 generates an output 640B from sensor 605A processed according to the second setting 610B, which is processed using the ML model processor 625 (e.g., the post-processing engine 245 and/or the trained ML model 260) and output to a vehicle ECU 630 (e.g., an example of the output device(s) 255) of a vehicle 510.

Similarly, the sensor signal processor 220 generates an output 640C from sensor 605B processed according to the first setting 610A, which is output using output device(s) 620. The sensor signal processor 220 generates an output 640D from sensor 605B processed according to the second setting 610B, which is processed using the ML model processor 625 and output to a vehicle ECU 630 of the vehicle 510. The sensor signal processor 220 generates an output 640E from sensor 605C processed according to the first setting 610A, which is output using output device(s) 620. The sensor signal processor 220 generates an output 640F from sensor 605C processed according to the second setting 610B, which is processed using the ML model processor 625 and output to a vehicle ECU 630 of the vehicle 510. The sensor signal processor 220 generates an output 640G from sensor 605N processed according to the first setting 610A, which is output using output device(s) 620. The sensor signal processor 220 generates an output 640H from sensor 605N processed according to the second setting 610B, which is processed using the ML model processor 625 and output to a vehicle ECU 630 of the vehicle 510.

In some examples, the context controller engine 215 can store and/or replicate a portion (e.g., a line) of sensor data an assign different contexts and therefore different ISP settings (e.g., first setting 610A vs. second setting 610B) to the respective replicate portions. Processing sensor data portion by portion allows the context controller engine 215 to store and/or replicate less data at a time.

Figure 7:
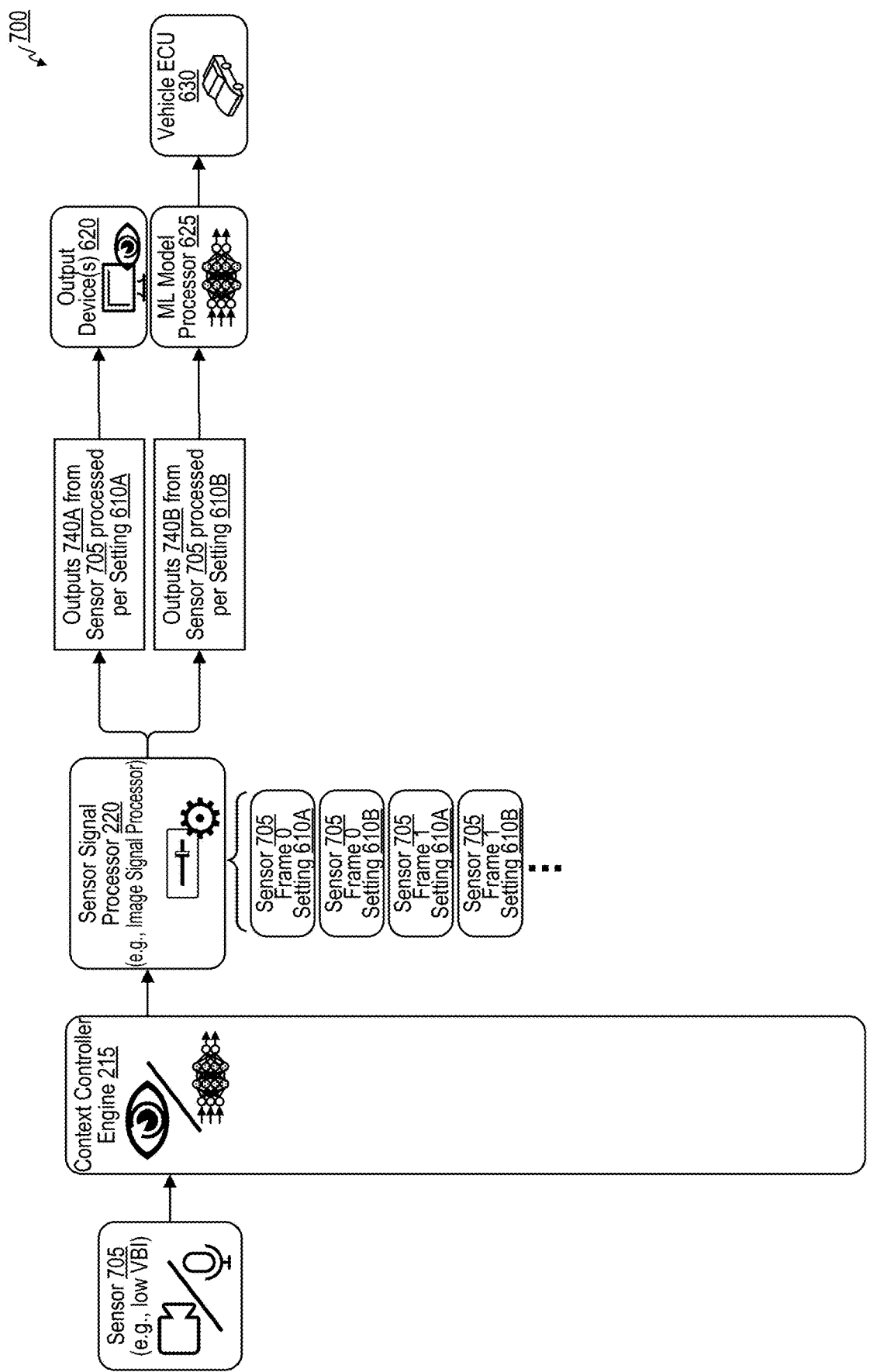
FIG. 7 is a block diagram illustrating a frame-interleaved multi-context imaging process performed using an imaging system, in accordance with some examples.

FIG. 7 is a block diagram illustrating a frame-interleaved multi-context imaging process performed using an imaging system 700. The imaging system 700 includes a sensor 705. The sensor 705 is an example of the sensor(s) 205. In some examples, the sensor 705 is an image sensor, such as the image sensor 130.

The imaging system 700 includes the context controller engine 215 and the sensor signal processor 220 as described with respect to FIG. 2 and FIG. 6. In some examples, the sensor signal processor 220 is an ISP, such as the ISP 154. The context controller engine 215 can select settings corresponding to different contexts, for instance including the first setting 610A and the second setting 610B of FIG. 6.

In some examples, a sensor signal processor 220 can have a high vertical blanking interval (VBI) requirement. The sensor 705 has a low vertical blanking interval (VBI), meaning that it may take a longer time to flush old sensor data from the sensor 705. To account for this, the context controller engine 215 can replicate the data from a frame from the sensor 705, and process the frame according to each of the different ISP settings (e.g., the first setting 610A and the second setting 610B), effectively treating the different replicates of the sensor data as data from different sensors in the context of FIG. 6. By the time this processing is complete, the old frame data is flushed from the sensor 705, and new frame data can be captured by the sensor 705 and processed using the sensor signal processor 220 according to the various ISP settings.

In some examples, the VBI for the sensor 705 can be indicated or used as an indication of a size of data from a frame that can be flushed in a given time interval, such as a number of lines of frame data, number of pixels of frame data, etc. For instance, in an illustrative example, the VBI requirement for the sensor 705 can be 100 lines. Because of this, in some examples, the VBI can dictate a size of the data from a frame that is processed by the sensor signal processor 220 using the different ISP settings.

An example frame-interleaved order of processing operations by the sensor signal processor 220 is illustrated below the sensor signal processor 220 in FIG. 6. The interleaved order of processing operations by the sensor signal processor 220 indicates that the sensor signal processor 220 processes frame 0 of sensor data from sensor 705 according to the first setting 610A, then processes frame 0 of sensor data from sensor 705 according to the second setting 610B, then processes frame 1 of sensor data from sensor 705 according to the first setting 610A, then processes line 1 of sensor data from sensor 705 according to the second setting 610B, and so forth.

The sensor signal processor 220 eventually generates outputs 740A from sensor 705 processed according to the first setting 610A, which are output using output device(s) 620. The output device(s) 620 are examples of the post-processing engine 240 and/or the output device(s) 250. The sensor signal processor 220 generates outputs 740B from sensor 705 processed according to the second setting 610B, which is processed using the ML model processor 625 (e.g., the post-processing engine 245 and/or the trained ML model 260) and output to a vehicle ECU 630 (e.g., an example of the output device(s) 255) of a vehicle 510.

Figure 8:
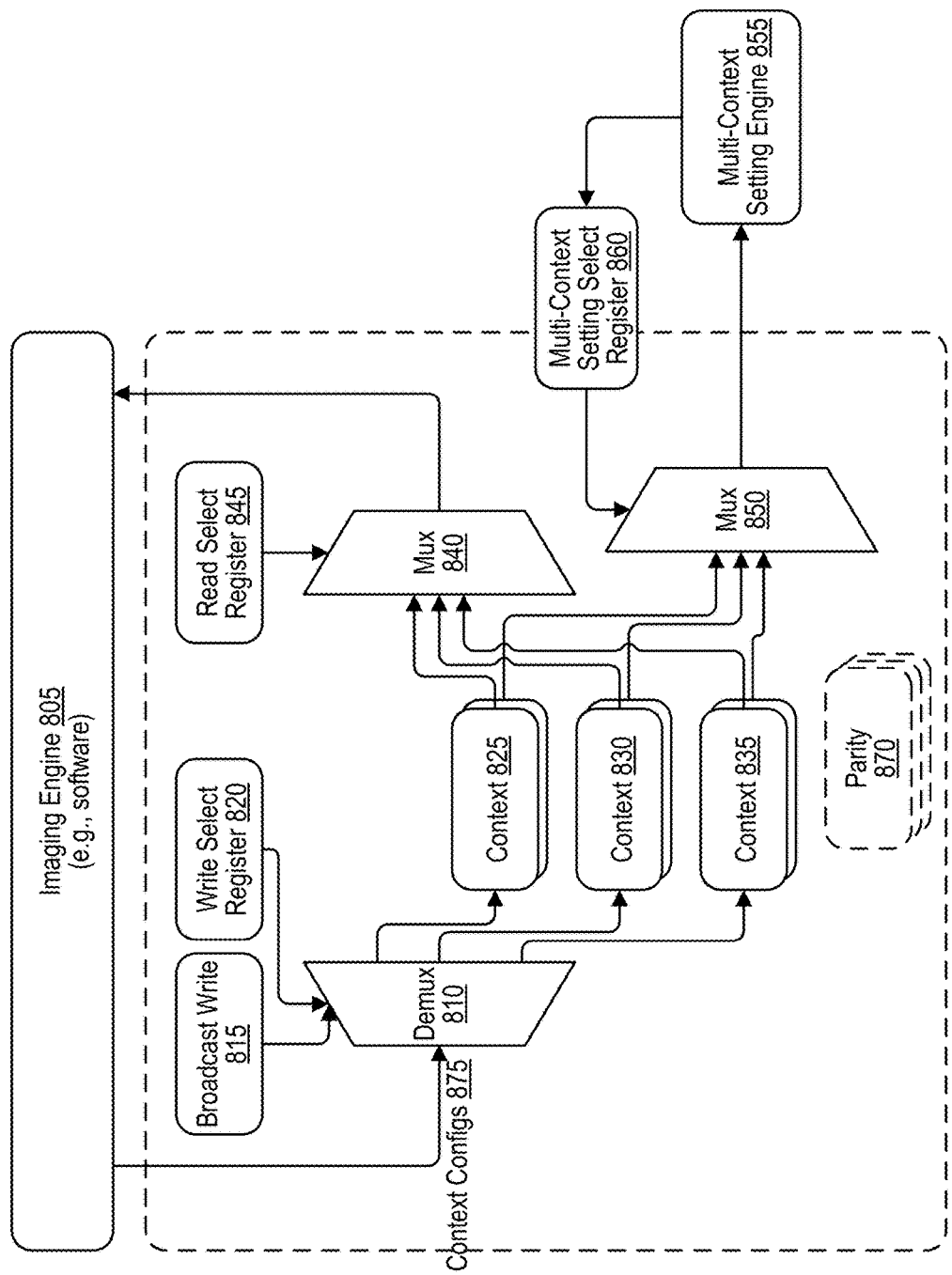
FIG. 8 is a block diagram illustrating an example architecture of a multi-context imaging process performed using an imaging system, in accordance with some examples.

FIG. 8 is a block diagram illustrating an example architecture of a multi-context imaging process performed using an imaging system 800. The imaging system 800 can be part of, and/or can include, the context controller engine 215 and/or the sensor signal processor 220. The imaging system 800 includes an imaging engine 805, which may include software elements, hardware elements, or a combination thereof. In some cases, the imaging engine 805 may be software running on a host processor (e.g., host processor 152 of FIG. 1), where the software may configure the settings for multiple contexts (e.g., context 825, context 830, and context 835) into the ISP hardware. In some aspects, the imaging engine 805 can be part of, and/or can include, the context controller engine 215 and/or the sensor signal processor 220.

The imaging engine 805 may convey context configurations 875 (e.g., human vision vs. computer vision, and/or corresponding ISP settings) to a demultiplexer 810. The imaging engine 805 includes three context data storage circuitry elements, referred to as context 825, context 830, and context 835. Each of these context data storage circuitry elements can store context configurations (e.g., including ISP settings) corresponding to different sensors, different contexts (e.g., human vision vs. computer vision), or a combination thereof. The imaging engine 805 can control which context configuration is stored in which of the three context data storage circuitry elements using a write select register 820. In some examples, the same context configuration can be used for all three context data storage circuitry elements as controllable by the imaging engine 805 via the broadcast write 815, for instance where the context data storage circuitry elements correspond to different sensors. The broadcast write 815 allows the same context configuration can be used for all three context data storage circuitry elements without configuring the three context data storage circuitry elements individually using the write select register 820.

The imaging system 800 includes a multiplexer 840 through which the imaging engine 805 can read the context configuration stored in any of the context data storage circuitry elements (context 825, context 830, and context 835) as controllable using the read select register 845.

The imaging engine 805 includes a multi-context setting engine 855 that receives, through a multiplexer 850, the various context configurations from the context data storage circuitry elements (context 825, context 830, and context 835), as selected by the multi-context setting engine 855 using the multi-context setting select register 860. The multi-context setting engine 855 may include software elements, hardware elements, or a combination thereof. The multi-context setting engine 855 can be part of, and/or can include, the context controller engine 215 and/or the sensor signal processor 220. In examples where the sensor signal processor 220 is set to process data from different sensors and/or different portions (e.g., lines) according to different context configurations (e.g., different ISP settings), the multi-context setting engine 855 can determine, based on which sensor's data is set to be processed next, and which portion (e.g., which line) is set to be processed next, which of the context configurations to retrieve (e.g., via the multi-context setting select register 860) from the context data storage circuitry elements (context 825, context 830, and context 835).

In some examples, the context data storage circuitry elements (context 825, context 830, and context 835) may each store two instances of the context configuration stored therein. In some examples, one instance is used for reading by the imaging engine 805 through the multiplexer 840, while the other instance is used for reading by the multi-context setting engine 855 through the multiplexer 850. This replication can allow both the imaging engine 805 and the multi-context setting engine 855 to read context configurations from the context data storage circuitry elements (context 825, context 830, and context 835) contemporaneously.

A parity 870 system may provide parity for the various elements of data stored in FIG. 8, such as the various instances of sensor data for the various contexts. The parity 870 system may trigger a warning if one or more bits of data flip unexpectedly, for instance due to a malfunction or a stray gamma ray that hits the circuitry of the imaging system 800. The parity 870 system may be an important safety feature for applications where data integrity is crucially important, such as computer vision for vehicles, where a wrong move by the vehicle could cause an accident.

In some examples, imaging systems (e.g., the imaging system 200, the imaging system 600, the imaging system 700, and/or the imaging system 800) may include data stores with look-up tables (LUTs) and/or switches (SWIs) that may be used to store correspondences between certain contexts (e.g., human vision vs. computer vision) and corresponding ISP settings.

Figure 9:
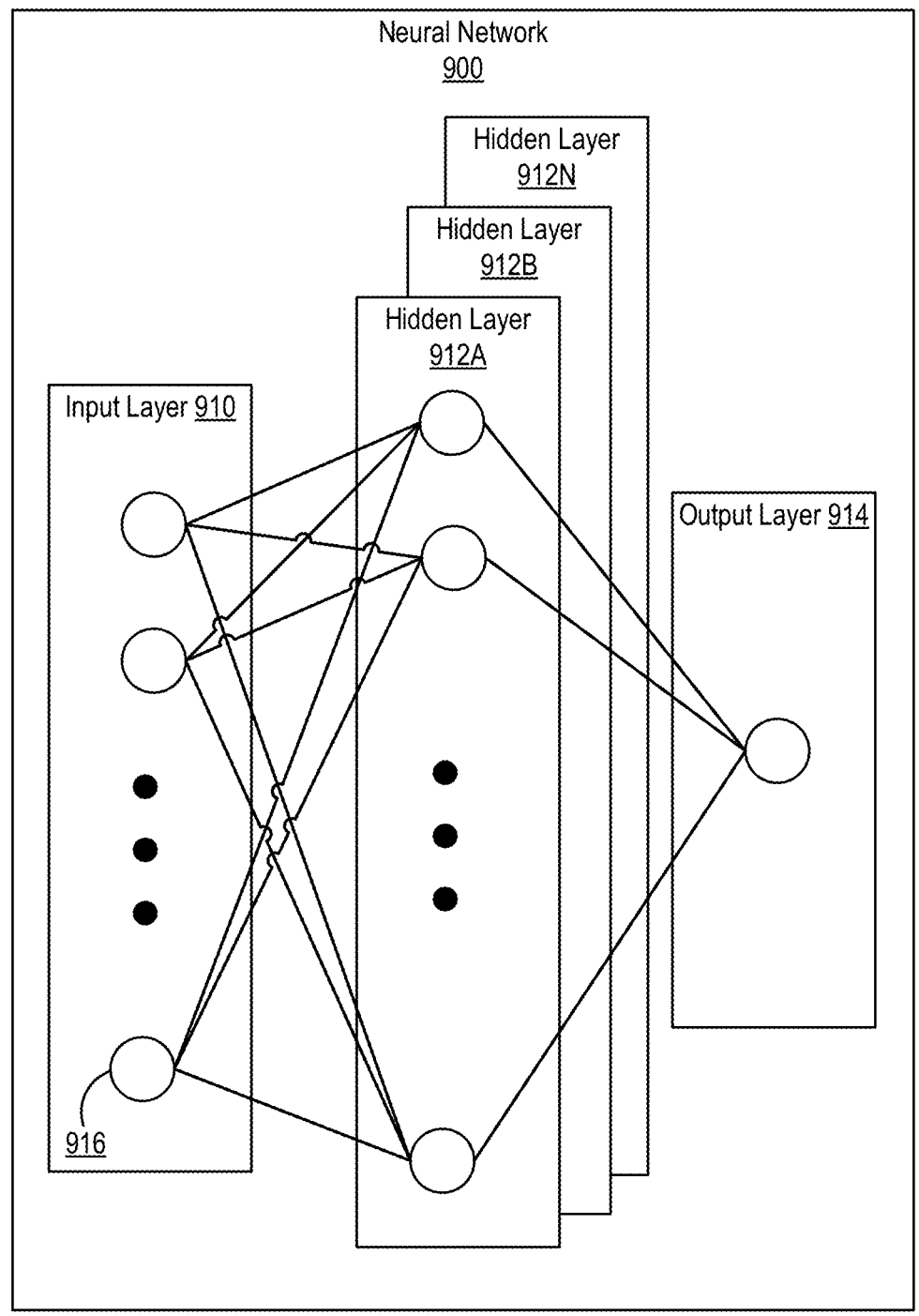
FIG. 9 is a block diagram illustrating an example of a neural network that can be used for imaging operations, in accordance with some examples.

FIG. 9 is a block diagram illustrating an example of a neural network (NN) 900 that can be used for media processing operations. The neural network 900 can include any type of deep network, such as a convolutional neural network (CNN), an autoencoder, a deep belief net (DBN), a Recurrent Neural Network (RNN), a Generative Adversarial Networks (GAN), and/or other type of neural network. The neural network 900 may be an example of one of the post-processing engine 245, the trained ML model(s) 260, the ML model processor 625, or a combination thereof. The neural network 900 may used by the post-processing engine 245, the output device(s) 255, the vehicle ECU 630, or a combination thereof.

An input layer 910 of the neural network 900 includes input data. The input data of the input layer 910 can include data representing the pixels of one or more input image frames. In some examples, the input data of the input layer 910 includes data representing the pixels of image data (e.g., an image captured by the image capture and processing system 100, raw image data of the raw sensor data 210, a first image of the first sensor data 230, a second image of the second sensor data 235, an image captured by one of the cameras 330A-330D, an image captured by one of the cameras 430A-430D, an image captured by one of the cameras 530A-530F, an image captured by one of the sensors 605A-605N, an image captured by the sensor 705, the raw image data of operation 1005, or a combination thereof.

The images can include image data from an image sensor including raw pixel data (including a single color per pixel based, for example, on a Bayer filter) or processed pixel values (e.g., RGB pixels of an RGB image). The neural network 900 includes multiple hidden layers 912, 912B, through 912N. The hidden layers 912, 912B, through 912N include "N" number of hidden layers, where "N" is an integer greater than or equal to one. The number of hidden layers can be made to include as many layers as needed for the given application. The neural network 900 further includes an output layer 914 that provides an output resulting from the processing performed by the hidden layers 912, 912B, through 912N.

In some examples, the output layer 914 can provide an output image, such as the first sensor data 230, the second sensor data 235, post-processing element(s) generated by the post-processing engine 240, post-processing element(s) generated by the post-processing engine 245, an image output by the output device(s) 250, an image output by the output device(s) 255, an image output by the output device(s) 620, an image generated using the ML model processor 625, the outputs 640A-640H, the outputs 740A-740B, or a combination thereof. In some examples, the output layer 914 can provide other types of data as well, such as data (e.g., the bounding boxes of the post-processing engine 245) identifying locations, areas, identities, tracked paths, and/or predicted paths of elements (e.g., features, objects, faces, persons, vehicles, or combinations thereof) that are detected, recognized, and/or tracked using the NN 900.

The neural network 900 is a multi-layer neural network of interconnected filters. Each filter can be trained to learn a feature representative of the input data. Information associated with the filters is shared among the different layers and each layer retains information as information is processed. In some cases, the neural network 900 can include a feed-forward network, in which case there are no feedback connections where outputs of the network are fed back into itself. In some cases, the network 900 can include a recurrent neural network, which can have loops that allow information to be carried across nodes while reading in input.

In some cases, information can be exchanged between the layers through node-to-node interconnections between the various layers. In some cases, the network can include a convolutional neural network, which may not link every node in one layer to every other node in the next layer. In networks where information is exchanged between layers, nodes of the input layer 910 can activate a set of nodes in the first hidden layer 912A. For example, as shown, each of the input nodes of the input layer 910 can be connected to each of the nodes of the first hidden layer 912A. The nodes of a hidden layer can transform the information of each input node by applying activation functions (e.g., filters) to this information. The information derived from the transformation can then be passed to and can activate the nodes of the next hidden layer 912B, which can perform their own designated functions. Example functions include convolutional functions, downscaling, upscaling, data transformation, and/or any other suitable functions. The output of the hidden layer 912B can then activate nodes of the next hidden layer, and so on. The output of the last hidden layer 912N can activate one or more nodes of the output layer 914, which provides a processed output image. In some cases, while nodes (e.g., node 916) in the neural network 900 are shown as having multiple output lines, a node has a single output and all lines shown as being output from a node represent the same output value.

In some cases, each node or interconnection between nodes can have a weight that is a set of parameters derived from the training of the neural network 900. For example, an interconnection between nodes can represent a piece of information learned about the interconnected nodes. The interconnection can have a tunable numeric weight that can be tuned (e.g., based on a training dataset), allowing the neural network 900 to be adaptive to inputs and able to learn as more and more data is processed.

The neural network 900 is pre-trained to process the features from the data in the input layer 910 using the different hidden layers 912, 912B, through 912N in order to provide the output through the output layer 914.

Figure 10:
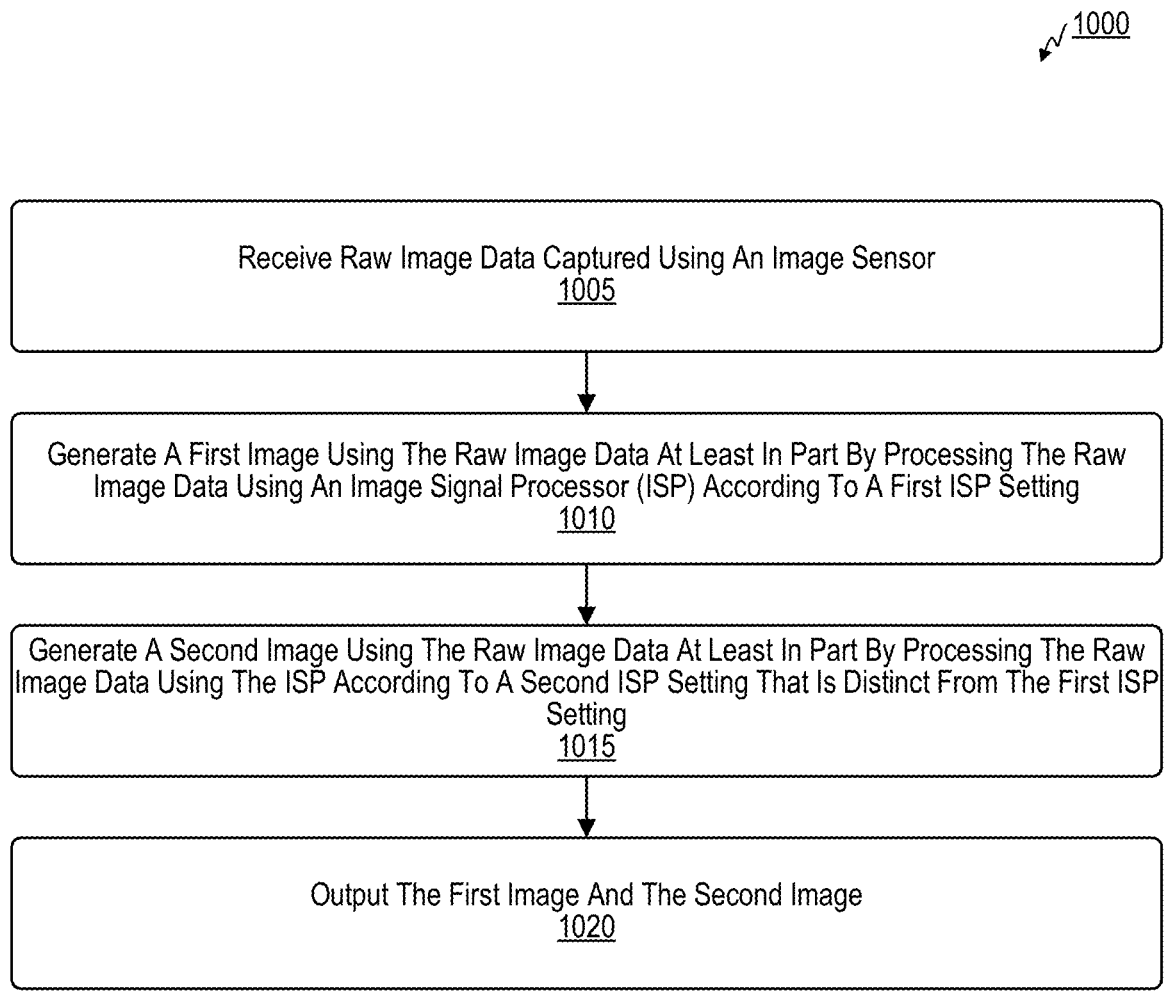
FIG. 10 is a flow diagram illustrating an imaging process, in accordance with some examples.

FIG. 10 is a flow diagram illustrating a process 1000 for imaging. The process 1000 for imaging may be performed by an imaging system or a component (e.g., a chipset, a processor or multiple processors such as an ISP, HP, or other processor, or other component) of the imaging system. In some examples, the imaging system can include, for example, the image capture and processing system 100, the image capture device 105A, the image processing device 105B, the image processor 150, the ISP 154, the host processor 152, the imaging system 200, the context controller engine 215, the sensor signal processor 220, the post-processing engine 240, the post-processing engine 245, the output device(s) 250, the output device(s) 255, the trained ML model(s) 260, the feedback engine 265, the HMD 310, the mobile handset 410, the vehicle 510, the imaging system 600, the sensors 605A-605N, the output device(s) 620, the ML model processor 625, the vehicle ECU 630, the imaging system 700, the imaging system 800, the neural network 900, the computing system 1100, the processor 1110, or a combination thereof. In some examples, the imaging system includes a display. In some examples, the imaging system includes a transceiver.

At operation 1005, the imaging system (or component thereof) may receive raw image data captured using an image sensor. Illustrative examples of the image sensor includes the image sensor 130, the sensor(s) 205, the first camera 330A, the second camera 330B, the third camera 330C, the fourth camera 330D, the first camera 430A, the second camera 430B, the third camera 430C, the fourth camera 430D, the first camera 530A, the second camera 530B, the third camera 530C, the fourth camera 530D, the fifth camera 530E, the sixth camera 530F, the first sensor 540A, the second sensor 540B, the sensors 605A-605N, the sensor 705, an image sensor used to capture an image used as input data for the input layer 910 of the NN 900, the input device 1145, another image sensor described herein, another sensor described herein, or a combination thereof. Examples of the raw image data includes the raw image data 210.

At operation 1010, the imaging system (or component thereof) may process (e.g., using ISP) the raw image data according to a first ISP setting to generate a first image. At operation 1015, the imaging system (or component thereof) may process (e.g., using the ISP), the raw image data according to a second ISP setting to generate a second image. The second ISP setting is distinct from the first ISP setting. For instance, according to some aspects, the second ISP setting is distinct from the first ISP setting based on at least one difference in at least one of brightness, color balance, tone mapping, sharpness, noise reduction, saturation, or white balance.

In some aspects, the first ISP setting and the second ISP setting are based on different contexts. In one illustrative example, the first ISP setting is associated with processing the raw image data for output, and the second ISP setting is associated with processing the raw image data for further processing using a trained machine learning model. For instance, the first ISP setting associated with processing the raw image data for output may correspond to outputting the raw image data for display. Additionally or alternatively, in another example, the first ISP setting associated with processing the raw image data for output may correspond to outputting the raw image data for transmission to a device. In some cases, the trained machine learning model is configured to perform the further processing for use in controlling a device or system, such as controlling a vehicle using an electronic control unit associated with the vehicle.

At operation 1020, the imaging system (or component thereof) may output the first image and the second image. For example, the imaging system (or component thereof) may output the first image and the second image by displaying the first image and/or the second image, by transmitting the first image and/or the second image to another device, a combination thereof, and/or otherwise outputting the first image and the second image.

In some aspects, the imaging system (or component thereof) may process a plurality of portions of the raw image data sequentially to process the raw image data. The imaging system (or component thereof) may interleave processing of a portion of the raw image data according to the first ISP setting with processing the portion of the raw image data according to the second ISP setting. An illustrative example of such interleaved processing is shown in FIG. 7. In some cases, the plurality of portions of the raw image data are a plurality of lines of the raw image data. In some cases, the plurality of portions of the raw image data are a plurality of frames of the raw image data. In some aspects, the imaging system (or component thereof) may determine a size of the plurality of portions of the raw image data based on a vertical blanking interval (VBI).

In some cases, the imaging system (or component thereof) may receive secondary raw image data captured using a secondary image sensor. The imaging system (or component thereof) may process the secondary raw image data according to a third ISP setting to generate a third image. The imaging system (or component thereof) may further process the secondary raw image data according to a fourth ISP setting to generate a fourth image. The imaging system (or component thereof) may output the third image and the fourth image. In some examples, the third ISP setting is the same as the first ISP setting, and wherein the fourth ISP setting is the same as the second ISP setting. In some aspects, the imaging system (or component thereof) may interleave processing of portions of the raw image data with processing corresponding portions of the secondary raw image data.

In some aspects, the imaging system (or component thereof) may receive additional raw image data captured using the image sensor. The imaging system (or component thereof) may process the additional raw image data according to the second ISP setting to generate a third image, where the first ISP setting is not used to generate the third image. The imaging system (or component thereof) may further output the first image and the second image.

In some examples, the processes described herein (e.g., the respective processes of FIGS. 1, 2, 6, 7, 8, 9, the process 1000 of FIG. 10, and/or other processes described herein) may be performed by a computing device or apparatus. In some examples, the processes described herein can be performed by the image capture and processing system 100, the image capture device 105A, the image processing device 105B, the image processor 150, the ISP 154, the host processor 152, the imaging system 200, the context controller engine 215, the sensor signal processor 220, the post-processing engine 240, the post-processing engine 245, the output device(s) 250, the output device(s) 255, the trained ML model(s) 260, the feedback engine 265, the HMD 310, the mobile handset 410, the vehicle 510, the imaging system 600, the sensors 605A-605N, the output device(s) 620, the ML model processor 625, the vehicle ECU 630, the imaging system 700, the imaging system 800, the neural network 900, the imaging system that performs the process 1000, the computing system 1100, the processor 1110, or a combination thereof.

The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the processes described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes described herein are illustrated as logical flow diagrams, block diagrams, or conceptual diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 11:
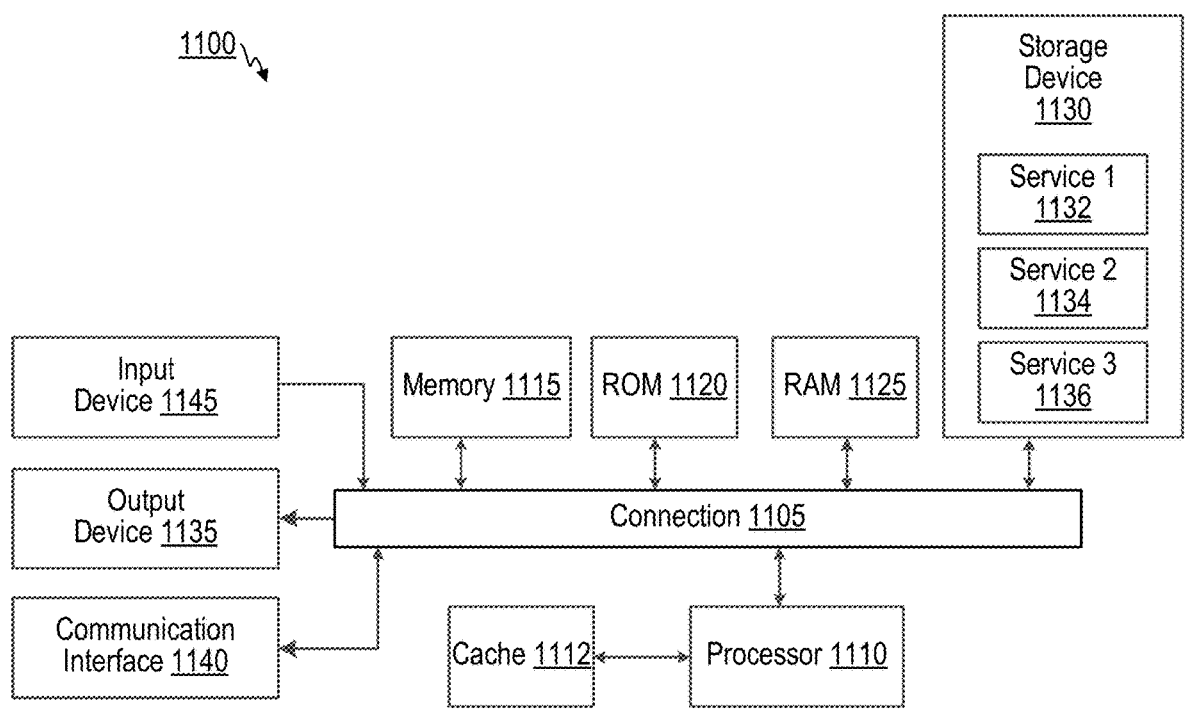
FIG. 11 is a diagram illustrating an example of a computing system for implementing certain aspects described herein.

FIG. 11 is a diagram illustrating an example of a system for implementing certain aspects of the present technology. In particular, FIG. 11 illustrates an example of computing system 1100, which can be for example any computing device making up internal computing system, a remote computing system, a camera, or any component thereof in which the components of the system are in communication with each other using connection 1105. Connection 1105 can be a physical connection using a bus, or a direct connection into processor 1110, such as in a chipset architecture. Connection 1105 can also be a virtual connection, networked connection, or logical connection.

In some aspects, computing system 1100 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 1100 includes at least one processing unit (CPU or processor) 1110 and connection 1105 that couples various system components including system memory 1115, such as read-only memory (ROM) 1120 and random access memory (RAM) 1125 to processor 1110. Computing system 1100 can include a cache 1112 of high-speed memory connected directly with, in close proximity to, or integrated as part of processor 1110.

Processor 1110 can include any general purpose processor and a hardware service or software service, such as services 1132, 1134, and 1136 stored in storage device 1130, configured to control processor 1110 as well as a special-purpose processor where software instructions are incorporated into the actual processor design. Processor 1110 may essentially be a completely self-contained computing system, containing multiple cores or processors, a bus, memory controller, cache, etc. A multi-core processor may be symmetric or asymmetric.

To enable user interaction, computing system 1100 includes an input device 1145, which can represent any number of input mechanisms, such as a microphone for speech, a touch-sensitive screen for gesture or graphical input, keyboard, mouse, motion input, speech, etc. Computing system 1100 can also include output device 1135, which can be one or more of a number of output mechanisms. In some instances, multimodal systems can enable a user to provide multiple types of input/output to communicate with computing system 1100. Computing system 1100 can include communications interface 1140, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 1102.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1140 may also include one or more Global Navigation Satellite System (GNSS) receivers or transceivers that are used to determine a location of the computing system 1100 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1130 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1130 can include software services, servers, services, etc., that when the code that defines such software is executed by the processor 1110, it causes the system to perform a function. In some aspects, a hardware service that performs a particular function can include the software component stored in a computer-readable medium in connection with the necessary hardware components, such as processor 1110, connection 1105, output device 1135, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some aspects, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1. An apparatus for user persona management, the apparatus comprising: a memory; and at least one processor (e.g., implemented in circuitry) coupled to the memory and configured to: receive raw image data captured using an image sensor; process the raw image data according to a first image signal processor (ISP) setting to generate a first image; process the raw image data according to a second ISP setting to generate a second image, wherein the second ISP setting is distinct from the first ISP setting; and output the first image and the second image.

Aspect 2. The apparatus of Aspect 1, wherein the first ISP setting and the second ISP setting are based on different contexts.

Aspect 3. The apparatus of any of Aspects 1 to 2, wherein the first ISP setting is associated with processing the raw image data for output, wherein the second ISP setting is associated with processing the raw image data for further processing using a trained machine learning model.

Aspect 4. The apparatus of Aspect 3, wherein the first ISP setting associated with processing the raw image data for output corresponds to outputting the raw image data for display.

Aspect 5. The apparatus of any of Aspects 3 or 4, wherein the first ISP setting associated with processing the raw image data for output corresponds to outputting the raw image data for transmission to a device.

Aspect 6. The apparatus of any of Aspects 3 to 5, wherein the trained machine learning model is configured to perform the further processing for use in controlling a vehicle using an electronic control unit associated with the vehicle.

Aspect 7. The apparatus of any of Aspects 1 to 6, wherein the at least one processor is configured to: process a plurality of portions of the raw image data sequentially to process the raw image data; and interleave processing of a portion of the raw image data according to the first ISP setting with processing the portion of the raw image data according to the second ISP setting.

Aspect 8. The apparatus of Aspect 7, wherein the plurality of portions of the raw image data are a plurality of lines of the raw image data.

Aspect 9. The apparatus of Aspect 7, wherein the plurality of portions of the raw image data are a plurality of frames of the raw image data.

Aspect 10. The apparatus of any of Aspects 7 to 9, wherein the at least one processor is configured to: determine a size of the plurality of portions of the raw image data based on a vertical blanking interval (VBI).

Aspect 11. The apparatus of any of Aspects 1 to 10, wherein the at least one processor is configured to: receive secondary raw image data captured using a secondary image sensor; process the secondary raw image data according to a third ISP setting to generate a third image; process the secondary raw image data according to a fourth ISP setting to generate a fourth image; and output the third image and the fourth image.

Aspect 12. The apparatus of Aspect 11, wherein the third ISP setting is the same as the first ISP setting, and wherein the fourth ISP setting is the same as the second ISP setting.

Aspect 13. The apparatus of any of Aspects 11 or 12, wherein the at least one processor is configured to interleave processing of portions of the raw image data with processing corresponding portions of the secondary raw image data.

Aspect 14. The apparatus of any of Aspects 1 to 13, wherein the second ISP setting is distinct from the first ISP setting based on at least one difference in at least one of brightness, color balance, tone mapping, sharpness, noise reduction, saturation, or white balance.

Aspect 15. The apparatus of any of Aspects 1 to 14, wherein the at least one processor is configured to: receive additional raw image data captured using the image sensor; process the additional raw image data according to the second ISP setting to generate a third image, wherein the first ISP setting is not used to generate the third image; and output the first image and the second image.

Aspect 16. The apparatus of any of Aspects 1 to 15, wherein the at least one processor includes an ISP.

Aspect 17. A method of multi-context image capture, comprising: receiving raw image data captured using an image sensor; processing, using an image signal processor (ISP), the raw image data according to a first ISP setting to generate a first image; processing, using the ISP, the raw image data according to a second ISP setting to generate a second image, wherein the second ISP setting is distinct from the first ISP setting; and outputting the first image and the second image.

Aspect 18. The method of Aspect 17, wherein the first ISP setting and the second ISP setting are based on different contexts.

Aspect 19. The method of any of Aspects 17 to 18, wherein the first ISP setting is associated with processing the raw image data for output, and wherein the second ISP setting is associated with processing the raw image data for further processing using a trained machine learning model.

Aspect 20. The method of Aspect 19, wherein the first ISP setting associated with processing the raw image data for output corresponds to at least one of outputting the raw image data for display.

Aspect 21. The method of any of Aspects 19 or 20, wherein the first ISP setting associated with processing the raw image data for output corresponds to outputting the raw image data for transmission to a device.

Aspect 22. The method of any of Aspects 19 to 21, wherein the trained machine learning model is configured to perform the further processing for use in controlling a vehicle using an electronic control unit associated with the vehicle.

Aspect 23. The method of any of Aspects 17 to 22, further comprising: processing a plurality of portions of the raw image data sequentially to process the raw image data; and interleaving processing of a portion of the raw image data according to the first ISP setting with processing the portion of the raw image data according to the second ISP setting.

Aspect 24. The method of Aspect 23, wherein the plurality of portions of the raw image data are a plurality of lines of the raw image data.

Aspect 25. The method of Aspect 23, wherein the plurality of portions of the raw image data are a plurality of frames of the raw image data.

Aspect 26. The method of any of Aspects 23 to 25, further comprising: determining a size of the plurality of portions of the raw image data based on a vertical blanking interval (VBI).

Aspect 27. The method of any of Aspects 17 to 26, further comprising: receiving secondary raw image data captured using a secondary image sensor; processing the secondary raw image data according to a third ISP setting to generate a third image; processing the secondary raw image data according to a fourth ISP setting to generate a fourth image; and outputting the third image and the fourth image.

Aspect 28. The method of Aspect 27, wherein the third ISP setting is the same as the first ISP setting, and wherein the fourth ISP setting is the same as the second ISP setting.

Aspect 29. The method of any of Aspects 27 or 28, further comprising interleaving processing of portions of the raw image data with processing corresponding portions of the secondary raw image data.

Aspect 30. The method of any of Aspects 17 to 29, wherein the second ISP setting is distinct from the first ISP setting based on at least one difference in at least one of brightness, color balance, tone mapping, sharpness, noise reduction, saturation, or white balance.

Aspect 31. The method of any of Aspects 17 to 30, further comprising: receiving additional raw image data captured using the image sensor; processing, using the ISP, the additional raw image data according to the second ISP setting to generate a third image, wherein the first ISP setting is not used to generate the third image; and outputting the first image and the second image.

Aspect 32. A non-transitory computer-readable medium having stored thereon instructions that, when executed by one or more processors, cause the one or more processors to perform operations according to any of Aspects 1 to 31.

Aspect 33. An apparatus for image processing, the apparatus comprising one or more means for performing operations according to any of Aspects 1 to 31.

What is claimed is:

1. An apparatus for multi-context image capture, the apparatus comprising:
    at least one memory; and
    at least one processor coupled to the at least one memory and configured to:
        receive raw image data of a scene, the raw image data captured using an image sensor;
        process the raw image data according to a first image signal processor (ISP) setting to generate a first image;
        process the raw image data according to a second ISP setting to generate a second image, wherein the second ISP setting is distinct from the first ISP setting, wherein the first ISP setting is configured based on a user interface of the apparatus, wherein the second ISP setting is configured based on a computer vision engine;
        output the first image through the user interface; and
        output the second image to the computer vision engine.

2. The apparatus of claim 1, wherein the first ISP setting and wherein the second ISP setting is configured based on a function of the computer vision engine, wherein the function includes at least one of edge detection or object detection.

3. The apparatus of claim 1, wherein the first ISP setting is associated with processing the raw image data with a first set of values for a parameter based on the user interface, wherein the second ISP setting is associated with processing the raw image data with a second set of values for the parameter based on further processing using a trained machine learning model of the computer vision engine, wherein the parameter includes at least one of brightness, tone, or color.

4. The apparatus of claim 1, wherein, to output the first image through the user interface, the at least one processor outputs the first image to a display to be displayed using the display.

5. The apparatus of claim 1, wherein, to output the first image through the user interface, the at least one processor outputs the first image to a transmitter for transmission of the first image to a recipient device.

6. The apparatus of claim 1, wherein the computer vision engine is configured to process the second image to detect at least one object in an environment for use in controlling a vehicle using an electronic control unit associated with the vehicle, wherein the image sensor is coupled to the vehicle, and wherein the vehicle is in the environment.

7. The apparatus of claim 1, wherein, to process the raw image data according to the first ISP setting and to process the raw image data according to the second ISP setting, the at least one processor is configured to:

interleave processing of a portion of the raw image data according to the first ISP setting with processing the portion of the raw image data according to the second ISP setting to process a plurality of portions of the raw image data sequentially, wherein the plurality of portions of the raw image data include the portion of the raw image data.

8. The apparatus of claim 7, wherein the plurality of portions of the raw image data are a plurality of lines of the raw image data.

9. The apparatus of claim 7, wherein the plurality of portions of the raw image data are a plurality of frames of the raw image data.

10. The apparatus of claim 7, wherein the at least one processor is configured to:
determine a size of the plurality of portions of the raw image data based on a vertical blanking interval (VBI).

11. The apparatus of claim 1, wherein the at least one processor is configured to:
receive secondary raw image data captured using a secondary image sensor;
process the secondary raw image data according to a third ISP setting to generate a third image;
process the secondary raw image data according to a fourth ISP setting to generate a fourth image;
output the third image; and
output the fourth image.

12. The apparatus of claim 11, wherein the third ISP setting matches the first ISP setting, wherein the fourth ISP setting matches the second ISP setting, wherein, to output the third image, the at least one processor is configured to output the third image through the user interface, and wherein, to output the fourth image, the at least one processor is configured to output the fourth image to the computer vision engine.

13. The apparatus of claim 11, wherein the at least one processor is configured to interleave processing of portions of the raw image data with processing corresponding portions of the secondary raw image data.

14. The apparatus of claim 1, wherein the second ISP setting is distinct from the first ISP setting based on at least one difference in at least one of brightness, color balance, tone mapping, sharpness, noise reduction, saturation, or white balance.

15. The apparatus of claim 1, wherein the at least one processor is configured to:
receive additional raw image data captured using the image sensor;
process the additional raw image data according to the second ISP setting to generate a third image, wherein the first ISP setting is not used to generate the third image; and
output the third image.

16. The apparatus of claim 1, wherein the at least one processor includes an ISP.

17. A method of multi-context image capture, comprising:
receiving raw image data of a scene, the raw image data captured using an image sensor;
processing, using an image signal processor (ISP), the raw image data according to a first ISP setting to generate a first image;
processing, using the ISP, the raw image data according to a second ISP setting to generate a second image, wherein the second ISP setting is distinct from the first ISP setting, wherein the first ISP setting is configured based on a user interface, wherein the second ISP setting is configured based on a computer vision engine;
outputting the first image through the user interface; and
outputting the second image to the computer vision engine.

18. The method of claim 17, wherein the first ISP setting and wherein the second ISP setting is configured based on a function of the computer vision engine, wherein the function includes at least one of edge detection or object detection.

19. The method of claim 17, wherein the first ISP setting is associated with processing the raw image data with a first set of values for a parameter based on the user interface, wherein the second ISP setting is associated with processing the raw image data with a second set of values for the parameter based on further processing using a trained machine learning model of the computer vision engine, wherein the parameter includes at least one of brightness, tone, or color.

20. The method of claim 17, wherein outputting the first image through the user interface includes at least one of outputting the first image to a display to be displayed using the display or outputting the first image to a transmitter for transmission of the first image to a recipient device.

21. The method of claim 17, wherein the computer vision engine is configured to process the second image to detect at least one object in an environment for use in controlling a vehicle using an electronic control unit associated with the vehicle, wherein the image sensor is coupled to the vehicle, and wherein the vehicle is in the environment.

22. The method of claim 17, wherein processing the raw image data according to the first ISP setting and processing the raw image data according to the second ISP setting include:
interleaving processing of a portion of the raw image data according to the first ISP setting with processing the portion of the raw image data according to the second ISP setting to process a plurality of portions of the raw image data sequentially, wherein the plurality of portions of the raw image data include the portion of the raw image data.

23. The method of claim 22, wherein the plurality of portions of the raw image data are a plurality of lines of the raw image data.

24. The method of claim 22, wherein the plurality of portions of the raw image data are a plurality of frames of the raw image data.

25. The method of claim 22, further comprising:
determining a size of the plurality of portions of the raw image data based on a vertical blanking interval (VBI).

26. The method of claim 17, further comprising:
receiving secondary raw image data captured using a secondary image sensor;
processing the secondary raw image data according to a third ISP setting to generate a third image;
processing the secondary raw image data according to a fourth ISP setting to generate a fourth image;
outputting the third image; and
outputting the fourth image.

27. The method of claim 26, wherein the third ISP setting matches the first ISP setting, and wherein the fourth ISP setting matches the second ISP setting, wherein outputting the third image includes outputting the third image through the user interface, and wherein outputting the fourth image includes outputting the fourth image to the computer vision engine.

28. The method of claim 26, further comprising interleaving processing of portions of the raw image data with processing corresponding portions of the secondary raw image data.

29. The method of claim 17, wherein the second ISP setting is distinct from the first ISP setting based on at least one difference in at least one of brightness, color balance, tone mapping, sharpness, noise reduction, saturation, or white balance.

30. The method of claim 17, further comprising:
   receiving additional raw image data captured using the image sensor;
   processing, using the ISP, the additional raw image data according to the second ISP setting to generate a third image, wherein the first ISP setting is not used to generate the third image; and
   outputting the third image.

* * * * *